United States Patent
Tajima

(10) Patent No.: US 12,353,706 B2
(45) Date of Patent: Jul. 8, 2025

(54) INFORMATION PROCESSING APPARATUS, NON-TRANSITORY COMPUTER READABLE MEDIUM, AND INFORMATION PROCESSING METHOD INVOLVING PROCESSOR CONFIGURED TO CAUSE A RECEIVING UNIT AND AN OPERATOR TO BE DISPLAYED ON AN EXECUTION SCREEN

(71) Applicant: FUJIFILM CORPORATION, Tokyo (JP)

(72) Inventor: Ryumon Tajima, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 162 days.

(21) Appl. No.: 18/051,013

(22) Filed: Oct. 31, 2022

(65) Prior Publication Data
US 2023/0168803 A1   Jun. 1, 2023

(30) Foreign Application Priority Data
Dec. 1, 2021  (JP) .................. 2021-195700

(51) Int. Cl.
*G06F 3/04886* (2022.01)
*G06F 9/451* (2018.01)

(52) U.S. Cl.
CPC .......... *G06F 3/04886* (2013.01); *G06F 9/451* (2018.02)

(58) Field of Classification Search
CPC .............. G06F 3/04886; G06F 9/451
(Continued)

(56) References Cited

U.S. PATENT DOCUMENTS

2002/0075317 A1 *  6/2002  Dardick .............. G06F 3/0481
                                                              715/808
2011/0087990 A1    4/2011  Ng et al.
(Continued)

FOREIGN PATENT DOCUMENTS

JP    2005-346179 A    12/2005
JP    2015-005129 A     1/2015
(Continued)

OTHER PUBLICATIONS

English language translation of the following: Office action dated Apr. 22, 2025 from the JPO in a Japanese patent application No. 2021-195700 corresponding to the instant patent application. This office action translation is submitted now in order to supplement the understanding of the cited references which are being disclosed in the instant Information Disclosure Statement.

*Primary Examiner* — Daniel Samwel
(74) *Attorney, Agent, or Firm* — SOLARIS Intellectual Property Group, PLLC

(57) ABSTRACT

An information processing apparatus includes: a processor configured to: in a case where a receiving unit is selected and a designation function is enabled, cause the receiving unit and an operator having received an operation by a user to be displayed on an execution screen displayed on a display in executing a transmission function for transmitting information, the receiving unit receiving input of a character for designating a destination for the transmission function in display setting regarding how the execution screen is displayed, the designation function designating, as the destination for the transmission function, a destination corresponding to the operator; and in a case where the display setting has not been performed and the designation function is enabled, cause the operator to be displayed on the execution screen without the receiving unit being displayed.

11 Claims, 24 Drawing Sheets

(58) Field of Classification Search
USPC .................................................. 715/700–866
See application file for complete search history.

(56) References Cited

U.S. PATENT DOCUMENTS

| | | | |
|---|---|---|---|
| 2014/0019976 A1* | 1/2014 | Naito | G06F 3/04886 |
| | | | 718/100 |
| 2014/0244621 A1* | 8/2014 | Lindsay | G06F 16/335 |
| | | | 707/722 |
| 2015/0138113 A1 | 5/2015 | Yamashita | |
| 2015/0146255 A1* | 5/2015 | Shintani | H04N 1/00413 |
| | | | 358/1.15 |
| 2015/0261431 A1 | 9/2015 | Ohtsuka et al. | |
| 2017/0279985 A1 | 9/2017 | Haruta et al. | |
| 2018/0084120 A1* | 3/2018 | Maruyama | H04N 1/00217 |

FOREIGN PATENT DOCUMENTS

| | | |
|---|---|---|
| JP | 2015-96989 A | 5/2015 |
| JP | 2017-173958 A | 9/2017 |
| JP | 2021-182266 A | 11/2021 |
| KR | 10-2004-0053692 A | 6/2004 |

* cited by examiner

INFORMATION PROCESSING APPARATUS, NON-TRANSITORY COMPUTER READABLE MEDIUM, AND INFORMATION PROCESSING METHOD INVOLVING PROCESSOR CONFIGURED TO CAUSE A RECEIVING UNIT AND AN OPERATOR TO BE DISPLAYED ON AN EXECUTION SCREEN

CROSS-REFERENCE TO RELATED APPLICATIONS

This application is based on and claims priority under 35 USC 119 from Japanese Patent Application No. 2021-195700, filed on Dec. 1, 2021, the entire disclosure of which is incorporated by reference herein.

BACKGROUND

(i) Technical Field

The present disclosure relates to an information processing apparatus, a non-transitory computer readable medium, and an information processing method.

(ii) Related Art

Japanese Unexamined Patent Application Publication No. 2015-005129 discloses an information terminal enabled to restrain a virtual keyboard activated by an application from obstructing display provided by a different application running for object operation.

SUMMARY

Image forming apparatuses are each provided with a function of display setting regarding how an execution screen is displayed on the display in executing a transmission function of transmitting information. In the display setting, a keyboard and a destination list, and the like are selectable. The keyboard serves as a receiving unit that receives input of one or more characters for designating a destination for the transmission function. The destination list is used to designate a destination for the transmission function from all of destinations registered in the image forming apparatus. In a state where the keyboard, the destination list, or the like has not been explicitly selected (is unset) by a user, a default setting is applied to the display setting. For example, the keyboard is selected at the default setting in the display setting.

The image forming apparatuses are also provided with a designation function of designating, as a destination for the transmission function, a destination corresponding to a button as an operator that receives an operation by the user.

If the display setting is unset in the image forming apparatus in the related art, the execution screen is displayed in a state where the keyboard has been selected at the default setting in the display setting. If the designation function is enabled in this case, the keyboard and buttons for the designation function are displayed on the execution screen, and the keyboard hides at least part of the buttons. Unless the keyboard hiding the buttons is made disappear from the display on the execution screen, it is not possible to designate a destination for the transmission function from among all of the buttons displayed on the execution screen.

Aspects of non-limiting embodiments of the present disclosure relate to providing a user who has not performed display setting with operability for designating a destination for a transmission function on any of operators displayed on the execution screen, without the user performing an operation on a display.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including: a processor configured to: in a case where a receiving unit is selected and a designation function is enabled, cause the receiving unit and an operator having received an operation by a user to be displayed on an execution screen displayed on a display in executing a transmission function for transmitting information, the receiving unit receiving input of a character for designating a destination for the transmission function in display setting regarding how the execution screen is displayed, the designation function designating, as the destination for the transmission function, a destination corresponding to the operator; and in a case where the display setting has not been performed and the designation function is enabled, cause the operator to be displayed on the execution screen without the receiving unit being displayed.

BRIEF DESCRIPTION OF THE DRAWINGS

Exemplary embodiments of the present disclosure will be described in detail based on the following figures, wherein.

DETAILED DESCRIPTION

Hereinafter, an image forming apparatus 20 serving as an example of an information processing apparatus according to an exemplary embodiment will be described.

First Exemplary Embodiment

Figure 1:
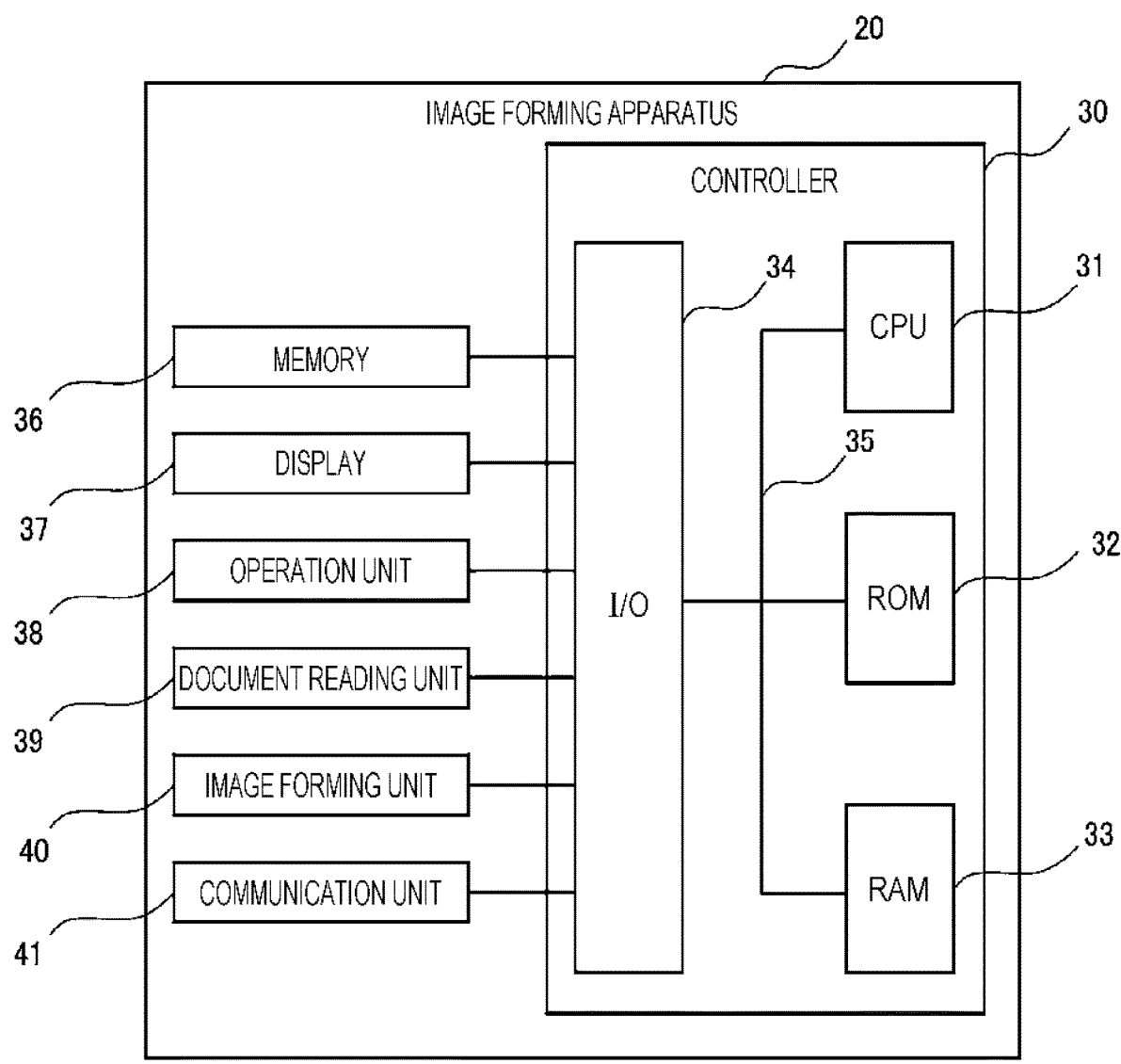
FIG. 1 is a block diagram illustrating the hardware configuration of an image forming apparatus.

FIG. 1 is a block diagram illustrating the hardware configuration of the image forming apparatus 20.

As illustrated in FIG. 1, the image forming apparatus 20 includes a controller 30 that controls the operation of the image forming apparatus 20. In the controller 30, a central processing unit (CPU) 31, a read only memory 32 (ROM), a random access memory (RAM) 33, and an input/output interface (I/O) 34 are connected to be able to communicate with each other with a bus 35 interposed therebetween.

The CPU 31, for example, runs various programs and controls the components. The CPU 31 thus reads out a program from the ROM 32 or a memory 36 (described later) and runs the program by using the RAM 33 as a work area. The CPU 31 performs various control and arithmetic operations in accordance with the programs recorded in the ROM 32 or the memory 36. The CPU 31 is an example of a processor.

The ROM 32 stores various programs and pieces of data. The RAM 33 serves as a work area and temporarily stores a program or data.

The memory 36, a display 37, an operation unit 38, a document reading unit 39, an image forming unit 40, and a communication unit 41 are connected to the I/O 34. These components are configured to be able to mutually communicate with the CPU 31 through the I/O 34.

The memory 36 is composed of a memory device such as a hard disk drive (HDD), a solid state drive (SSD), or a flash memory and stores various programs and pieces of data. In the first exemplary embodiment, the memory 36 stores at least an information processing program for executing a decision process (described later). Note that the information processing program may be installed in advance in the image forming apparatus 20 or may be appropriately installed in the image forming apparatus 20, for example, in such a manner as to be stored in the nonvolatile storage medium or distributed through a network. Conceivable examples of the nonvolatile storage medium include a CD-ROM, a magneto-optical disk, a HDD, a DVD-ROM, a flash memory, and a memory card.

For example, a liquid crystal display or an organic electro luminescence (EL) display is used for the display 37. The display 37 integrally includes a touch panel. The display 37 is an example of a display.

The operation unit 38 is provided with various operation keys such as a ten key pad and a start key.

The display 37 and the operation unit 38 receive various instructions from a user of the image forming apparatus 20. Examples of the various instructions include an instruction to start printing a document and an instruction to start copying a document. The display 37 displays various pieces of information such as the result of a process executed in accordance with an instruction received from the user and a report of the process.

The document reading unit 39 takes in documents, one by one, placed on the sheet feeder of an auto document feeder (not illustrated) provided on the upper portion of the image forming apparatus 20 and optically reads each document taken in to acquire image information. Alternatively, the document reading unit 39 optically reads a document placed on a flat bed such as a platen glass to acquire image information.

The image forming unit 40 forms, on the recording medium such as a paper sheet, an image or the like based on image information obtained by the reading by the document reading unit 39 or obtained by an external PC or the like connected through the network.

The communication unit 41 is an interface to communicate with a different apparatus. For the communication, for example, a wired communication standard such as Ethernet (registered trademark) or FDDI or a wireless communication standard such as 4G, 5G, or Wi-Fi (registered trademark) is used.

When running the information processing program described above, the image forming apparatus 20 executes a process based on the information processing program by using the hardware resources described above.

Next, functions and settings provided for the image forming apparatus 20 will be described.

The image forming apparatus 20 has a designation function of designating, as a destination for a transmission function of transmitting information, a destination corresponding to one of destination buttons 61 (see FIG. 6) having received an operation by the user. Each destination button 61 is an example of an operator. Examples of the transmission function include an e-mail transmission function, a fax transmission function, an Internet fax transmission function, and a scan and transmission function.

Hereinafter, the designation function will be described.

Figure 2:
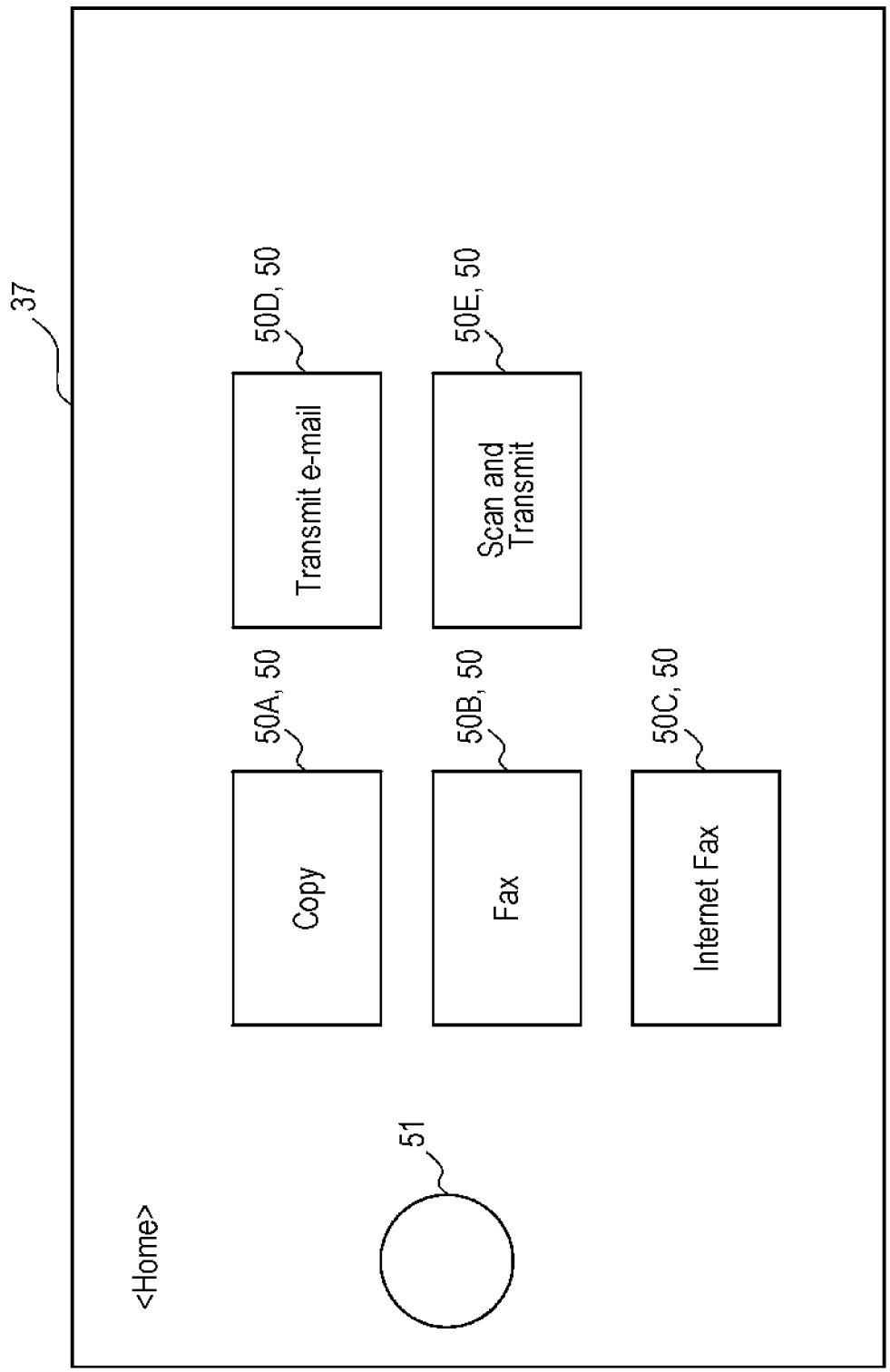
FIG. 2 illustrates a first display example of a display of the image forming apparatus.

FIG. 2 illustrates a first display example of the display 37 of the image forming apparatus 20. Specifically, FIG. 2 illustrates a Home screen displayed first on the display 37 after the user logs in the image forming apparatus 20.

As illustrated in FIG. 2, function buttons 50 and a setting button 51 are displayed on the Home screen. By using characters, the function buttons 50 represent various functions executable by the image forming apparatus 20. The setting button 51 is provided to transition to a setting screen on which the setting of the image forming apparatus 20 is changeable. As the function buttons 50, for example, a function button 50A for executing a copying function, a function button 50B for executing the fax transmission function, a function button 50C for executing the Internet fax transmission function, a function button 50D for executing the e-mail transmission function, and a function button 50E for executing the scan and transmission function are provided. If any one of the function buttons 50 is operated on the Home screen illustrated in FIG. 2, an execution screen for executing one of the various functions that corresponds to the operated function button 50 is displayed on the display 37.

Figure 3:
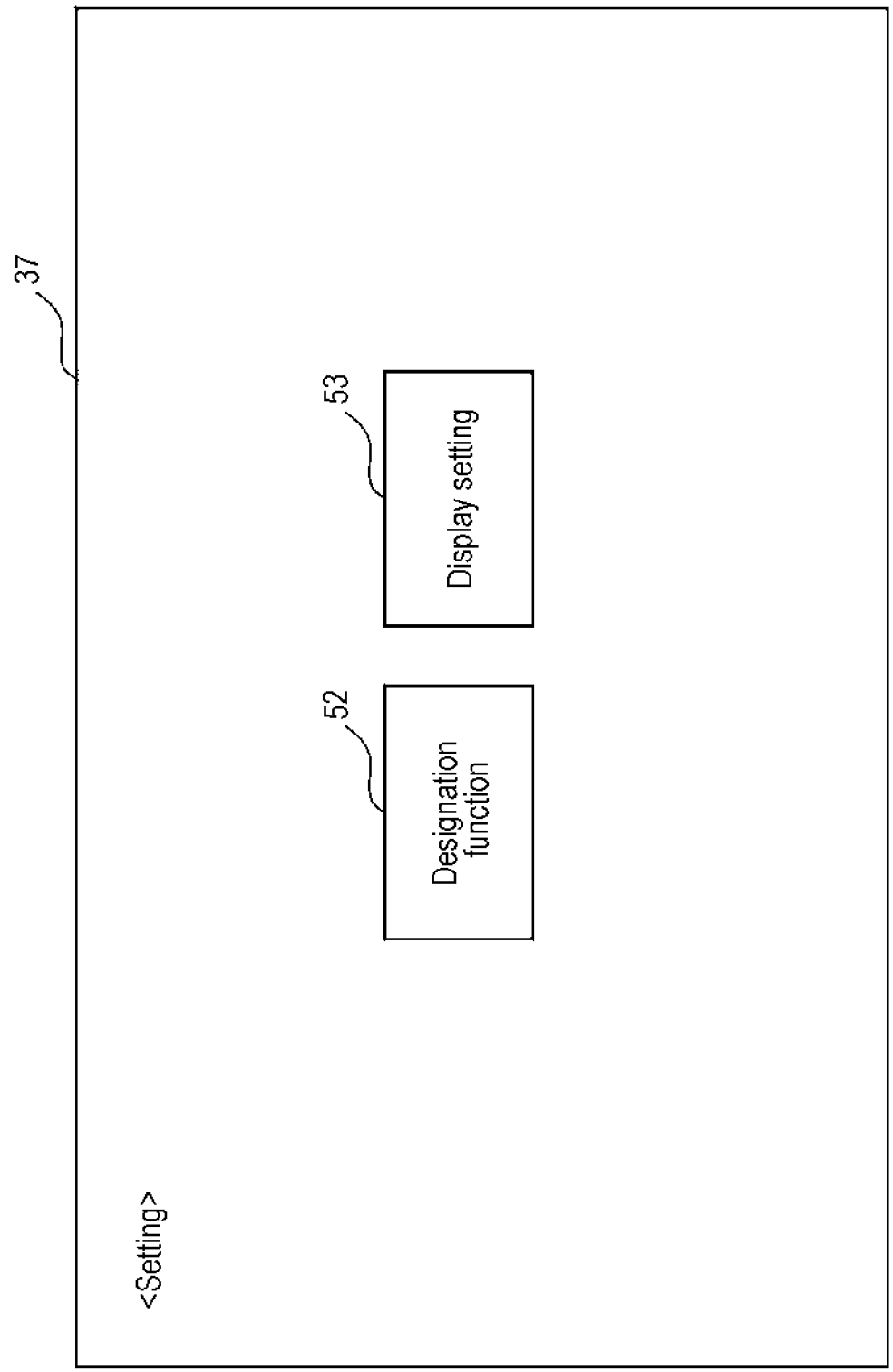
FIG. 3 illustrates a second display example of the display of the image forming apparatus.

FIG. 3 illustrates a second display example of the display 37 of the image forming apparatus 20. FIG. 3 illustrates a state after the setting button 51 is operated on the Home screen illustrated in FIG. 2. The setting screen is thus displayed on the display 37 illustrated in FIG. 3.

As illustrated in FIG. 3, a changing button 52 for changing the setting of the designation function and a changing button 53 for changing the display setting regarding how the execution screen is displayed are displayed on the setting screen.

Figure 4:
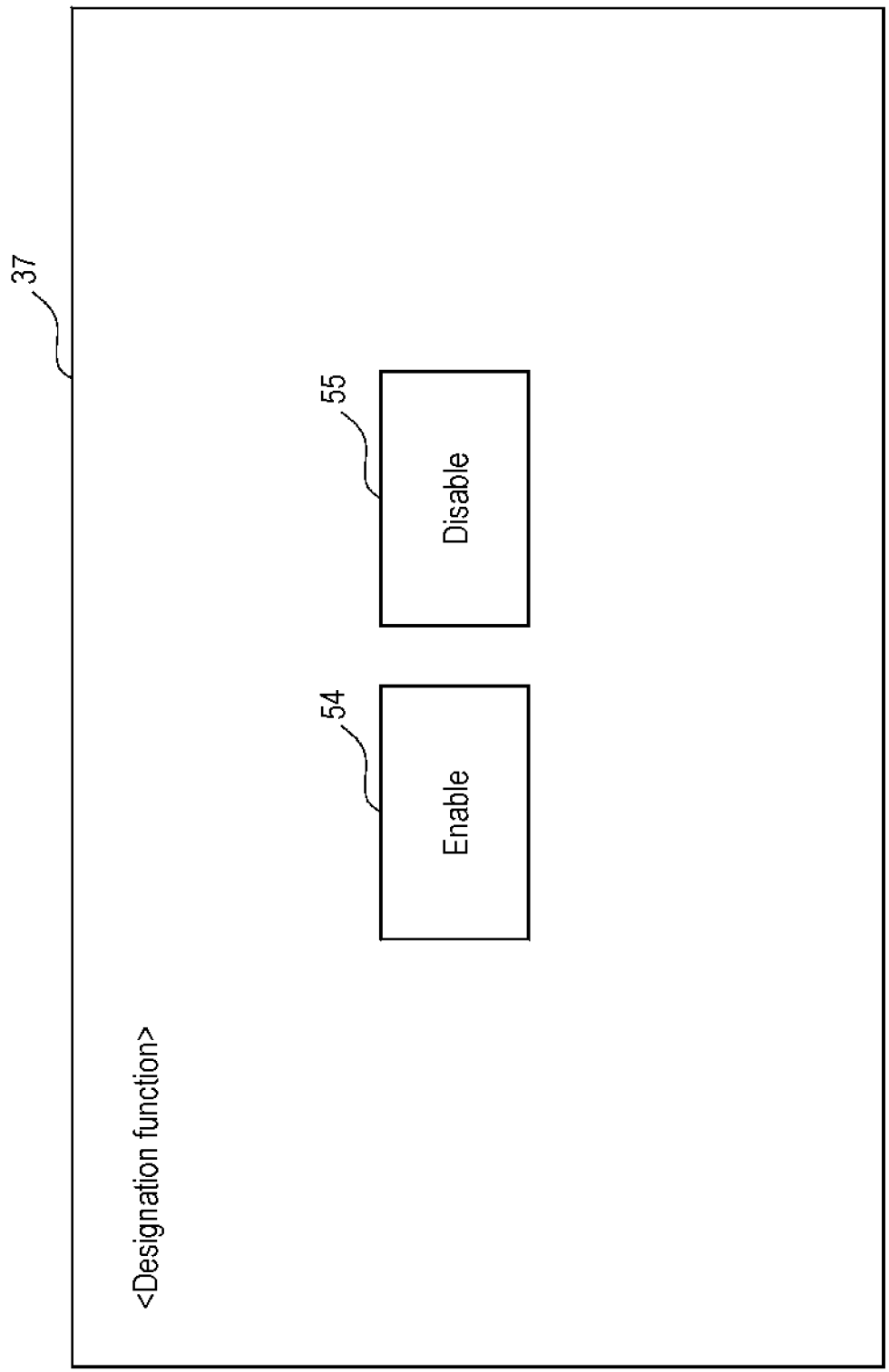
FIG. 4 illustrates a third display example of the display of the image forming apparatus.

FIG. 4 illustrates a third display example of the display 37 of the image forming apparatus 20. FIG. 4 illustrates a state after the changing button 52 is operated on the setting screen illustrated in FIG. 3.

FIG. 4 depicts an enabling button 54 for enabling, that is, turning on the designation function and a disabling button 55 for disabling, that is, turning off the designation function.

Figure 5:
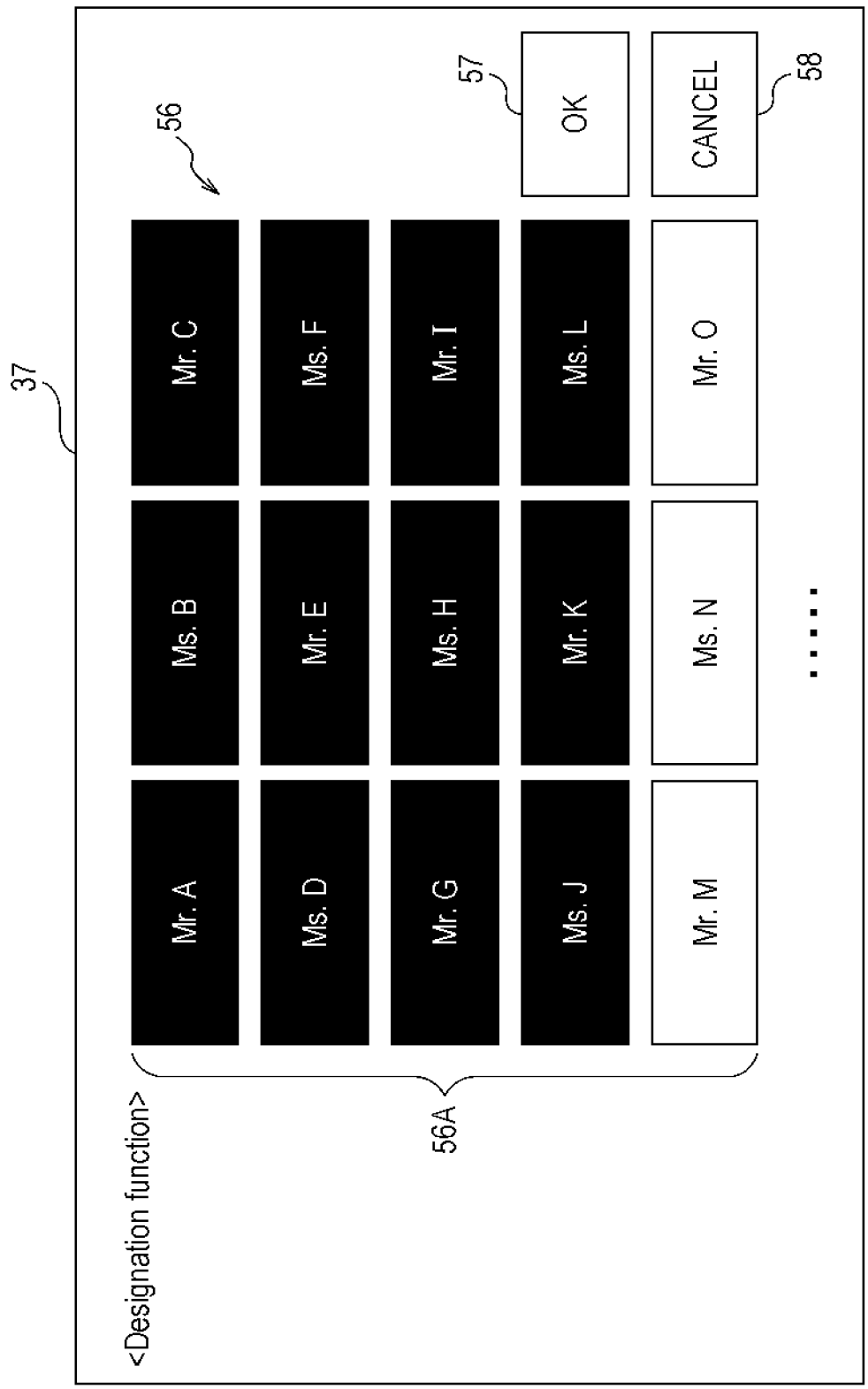
FIG. 5 illustrates a fourth display example of the display of the image forming apparatus.

FIG. 5 illustrates a fourth display example of the display 37 of the image forming apparatus 20. FIG. 5 illustrates a state after the enabling button 54 is operated on the screen illustrated in FIG. 4.

FIG. 5 depicts a destination list 56 representing a list of all of destinations registered in the image forming apparatus 20, an OK button 57, and a cancellation button 58. Multiple user name buttons 56A representing the respective user names of users such as Mr. A, Ms. B, and Mr. C are displayed in the destination list 56.

In FIG. 5, if the OK button 57 is operated in a state where one or more of the user name buttons 56A are selected from the destination list 56, one or more users corresponding to the selected one or more user name buttons 56A are each registered as a destination for the designation function. In FIG. 5, the user name buttons 56A selected by the user of the image forming apparatus 20 from among the user name buttons 56A are illustrated in such a manner as to be filled with black. In FIG. 5, if the cancellation button 58 is operated, the changing of the setting of the designation function is cancelled, and the Home screen is then displayed on the display 37.

Figure 6:
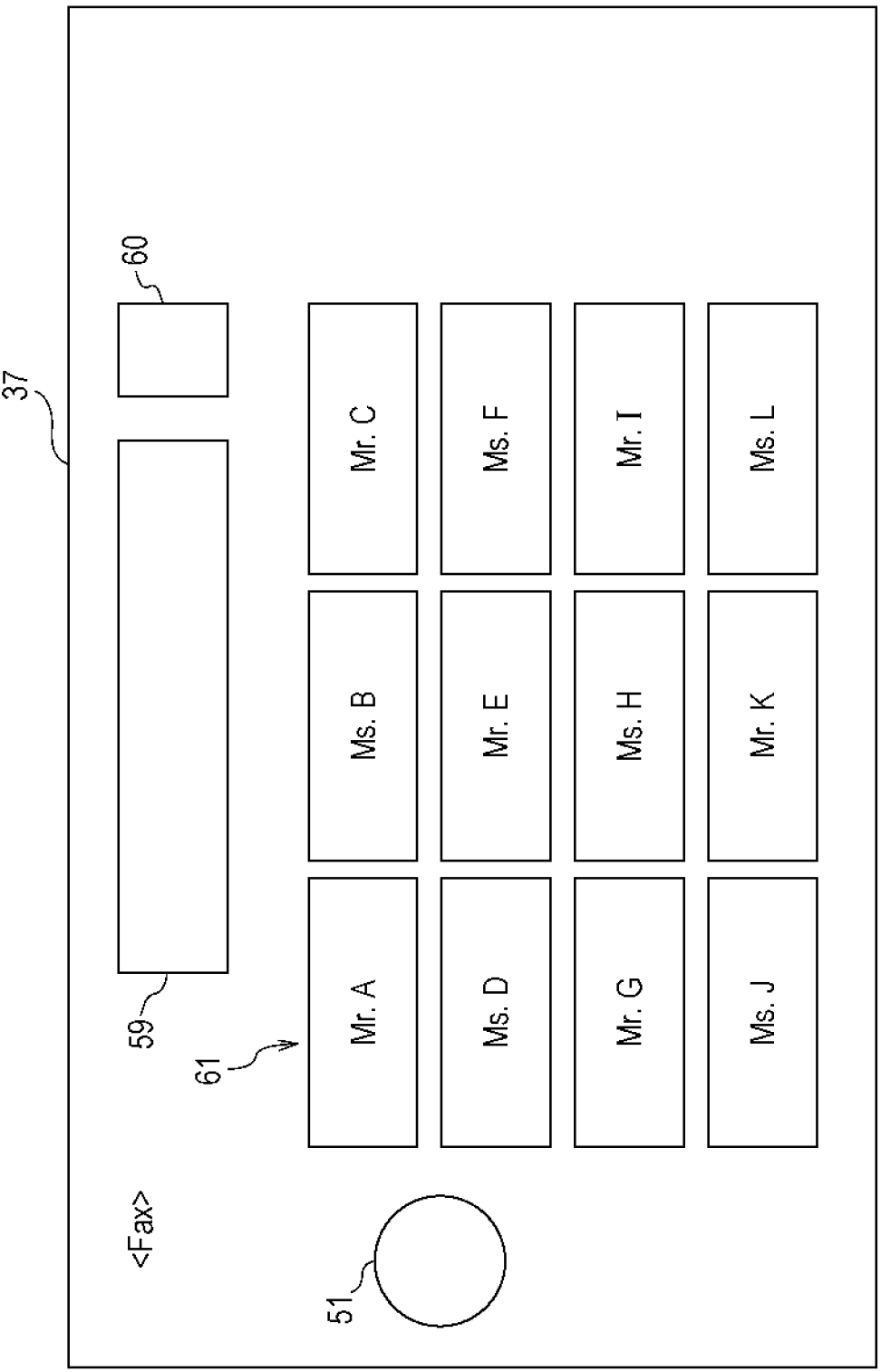
FIG. 6 illustrates a fifth display example of the display of the image forming apparatus.

FIG. 6 illustrates a fifth display example of the display 37 of the image forming apparatus 20. FIG. 6 illustrates a state after the function button 50B is operated on the Home screen after the OK button 57 is operated on the screen illustrated in FIG. 5. FIG. 6 thus illustrates an execution screen displayed on the display 37 to execute the fax transmission function. For example, the execution screen illustrated in FIG. 6 is a screen first displayed on the display 37 after the function button 50B is operated on the Home screen.

As illustrated in FIG. 6, the setting button 51, an input field 59, a list button 60, and the destination buttons 61 are displayed on the execution screen.

The input field 59 is a portion where one or more characters input with a keyboard 64 (see FIG. 11 (described later)) are displayed. The keyboard 64 is an example of a receiving unit.

The list button 60 is a button for displaying a list screen on which the destination list 56 is displayed.

Each destination button 61 is a button having a user name to serve as a candidate for a destination for the transmission function. Buttons corresponding to the users registered as destinations for the designation function are displayed as the destination buttons 61 on the screen illustrated in FIG. 5. Specifically, the destination buttons 61 illustrated in FIG. 6 are provided as buttons respectively corresponding to Mr. A, Ms. B, Mr. C, Ms. D, Mr. E, Ms. F, Mr. G, Ms. H, Mr. I, Ms. J, Mr. K, and Ms. L.

The four destination buttons 61 are arranged in the longitudinal direction of the display 37, and the three destination buttons 61 are arranged in the lateral direction. Up to 12 destination buttons 61 are displayable on one screen. If the number of users registered as the destinations for the designation function is higher than or equal to 13, not all of the destination buttons 61 corresponding to the users are not displayed on the one screen. By changing the screen to another, the destination buttons 61 corresponding to the users not displayed on one screen may be verified.

Figure 7:
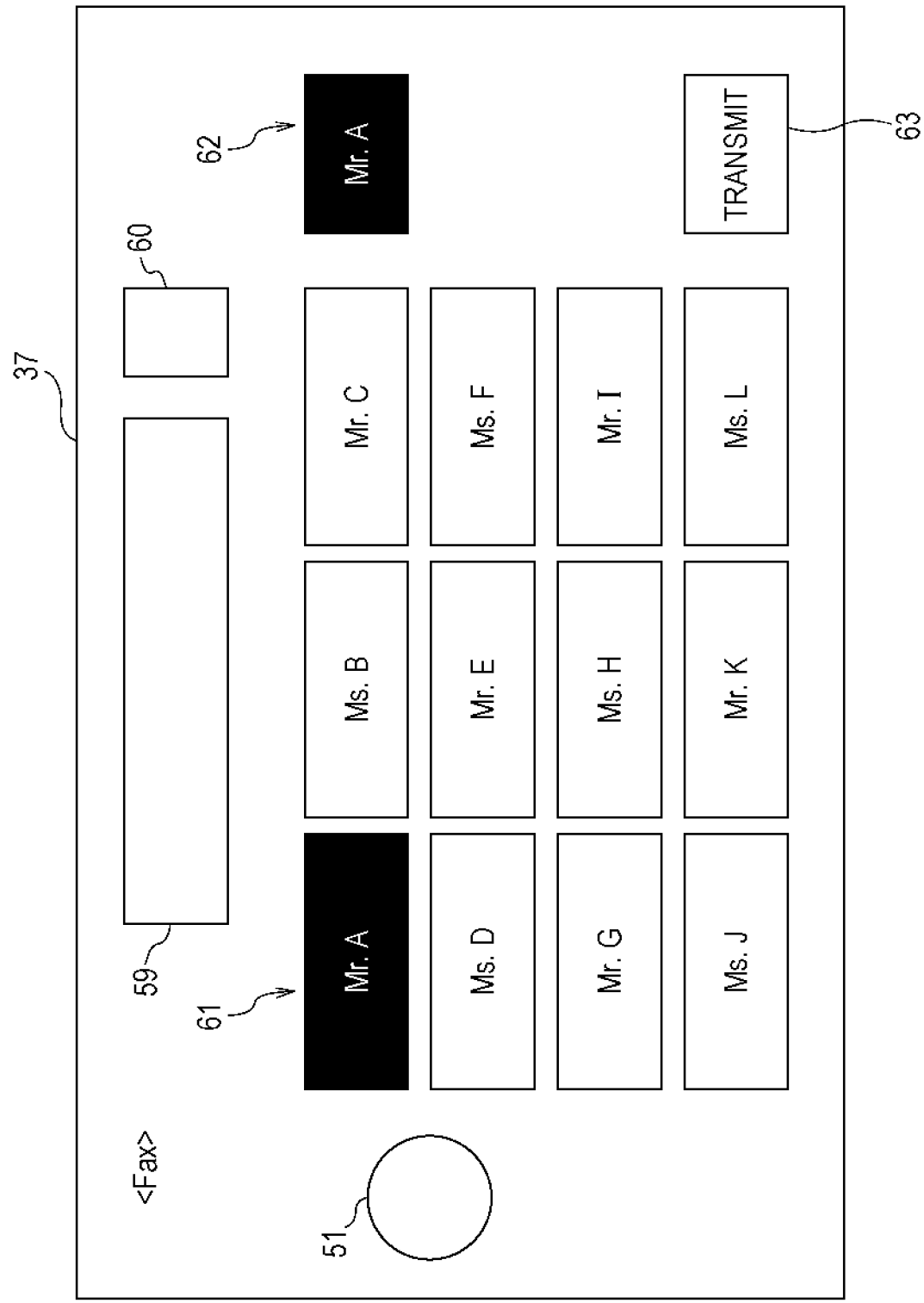
FIG. 7 illustrates a sixth display example of the display of the image forming apparatus.

FIG. 7 illustrates a sixth display example of the display 37 of the image forming apparatus 20. FIG. 7 illustrates a state after one of the destination buttons 61 is operated on the execution screen illustrated in FIG. 6. Specifically, FIG. 7 illustrates a state after the destination button 61 corresponding to the user name "Mr. A" is operated. Note that FIG. 7 illustrates the destination button 61 having received the operation by the user of the image forming apparatus 20 in such a manner as to be filled with black.

As illustrated in FIG. 7, a transmission destination 62 representing the destination for the transmission function and a transmission button 63 are displayed on the execution screen after the destination button 61 is operated. Specifically, in FIG. 7, the user "Mr. A" corresponding to the destination button 61 having received the operation by the user is displayed in the transmission destination 62. In FIG. 7, in response to the operation of the transmission button 63, faxing to "Mr. A" is performed.

Figure 8:
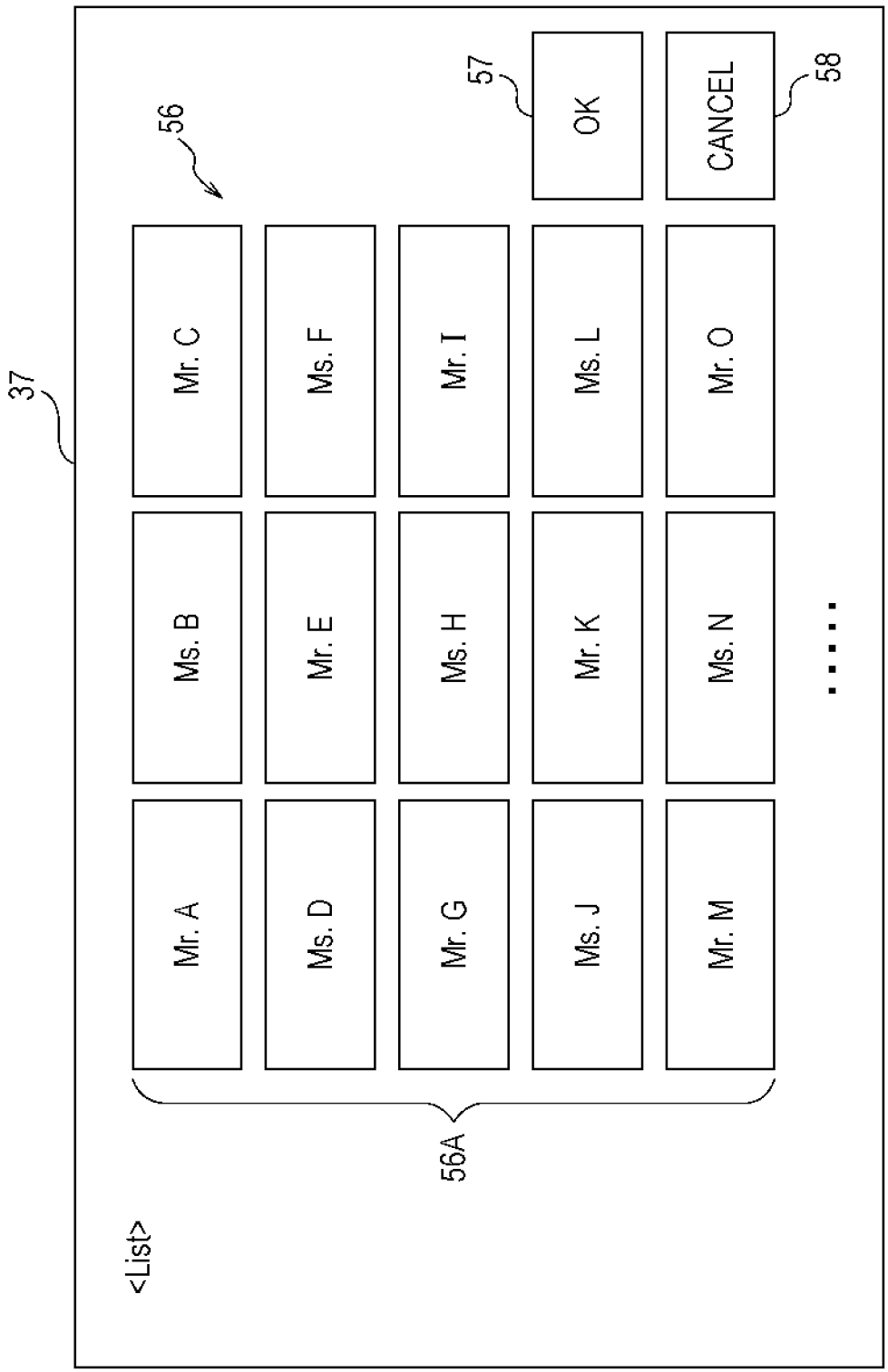
FIG. 8 illustrates a seventh display example of the display of the image forming apparatus.

FIG. 8 illustrates a seventh display example of the display 37 of the image forming apparatus 20. FIG. 8 illustrates a state after the list button 60 is operated on the execution screen illustrated in FIG. 7. Specifically, FIG. 8 illustrates the list screen.

As illustrated in FIG. 8, the destination list 56, the OK button 57, and the cancellation button 58 are displayed on the list screen.

Figure 9:
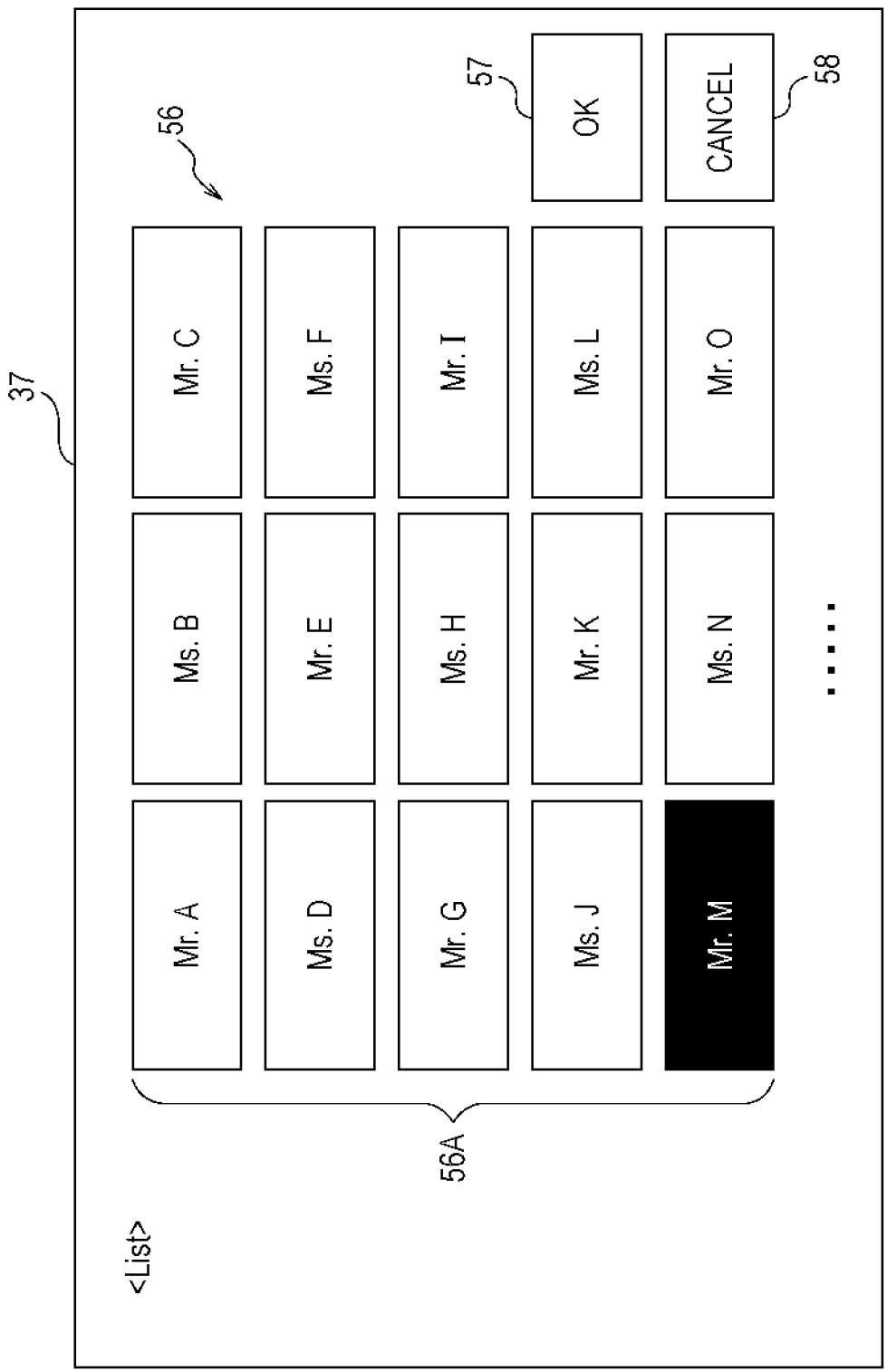
FIG. 9 illustrates an eighth display example of the display of the image forming apparatus.

FIG. 9 illustrates an eighth display example of the display 37 of the image forming apparatus 20. FIG. 9 illustrates a state after one of the user name buttons 56A is operated on the list screen illustrated in FIG. 8. Specifically, FIG. 9 illustrates a state after the user name button 56A corresponding to the user name "Mr. M" is operated. Note that in FIG. 9, the user name button 56A selected by the user of the image forming apparatus 20 from among the user name buttons 56A is illustrated in such a manner as to be filled with black.

In FIG. 9, in response to the operation of the OK button 57, the user "Mr. M" corresponding to the user name button 56A having received the operation by the user of the image forming apparatus 20 is added to the transmission destination 62 (see FIG. 10). In FIG. 9, in response to the operation of the cancellation button 58, designation of the transmission destination 62 from the destination list 56 is cancelled, and the execution screen illustrated in FIG. 7 is displayed on the display 37.

Figure 10:
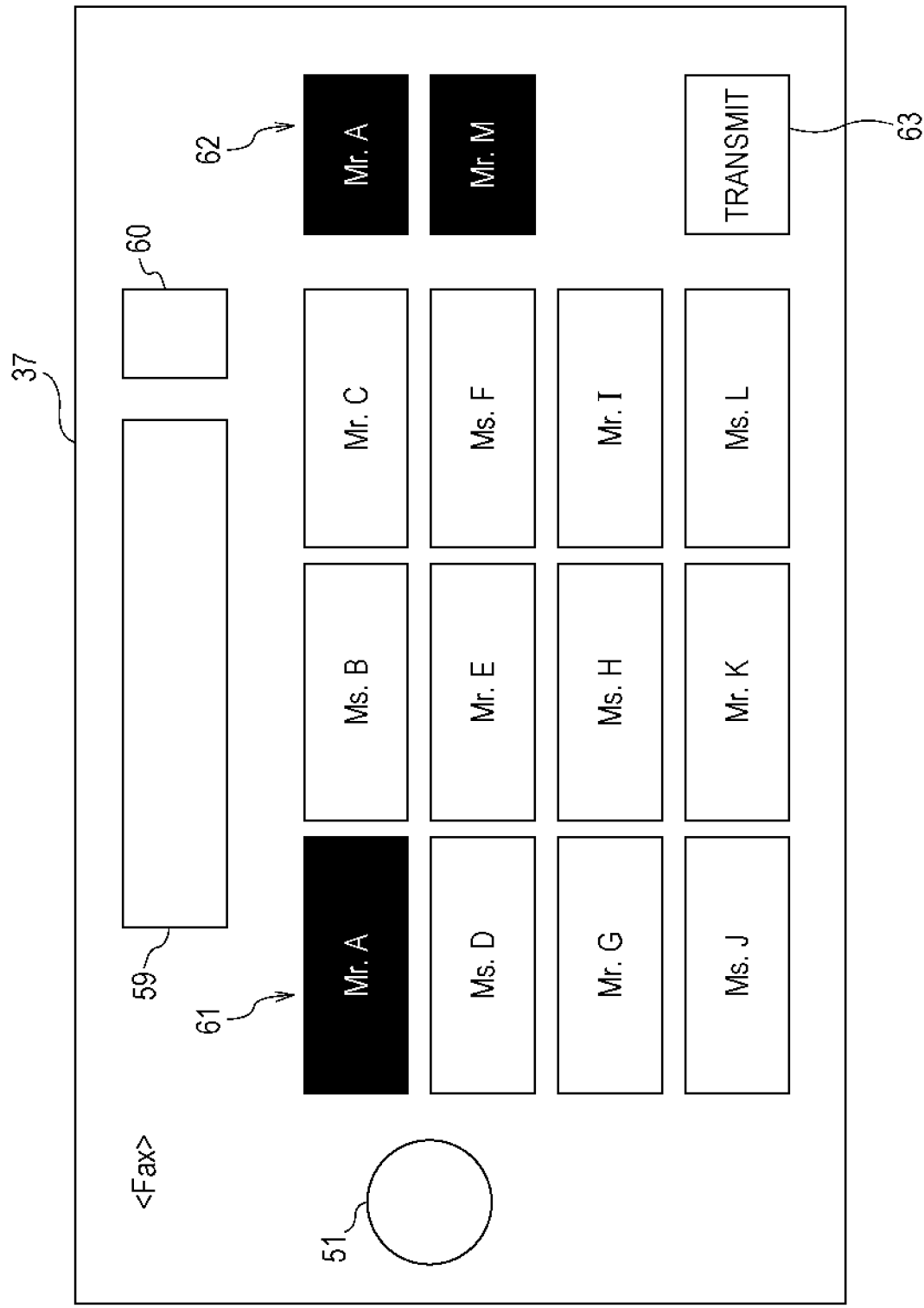
FIG. 10 illustrates a ninth display example of the display of the image forming apparatus.

FIG. 10 illustrates a ninth display example of the display 37 of the image forming apparatus 20. FIG. 10 illustrates a state after the OK button 57 is operated on the list screen illustrated in FIG. 9.

On the execution screen illustrated in FIG. 10, "Mr. M" is added to the transmission destination 62 to the execution screen illustrated in FIG. 7. In FIG. 10, in response to the operation of the transmission button 63, faxing to "Mr. A" and "Mr. M" is performed.

Figure 11:
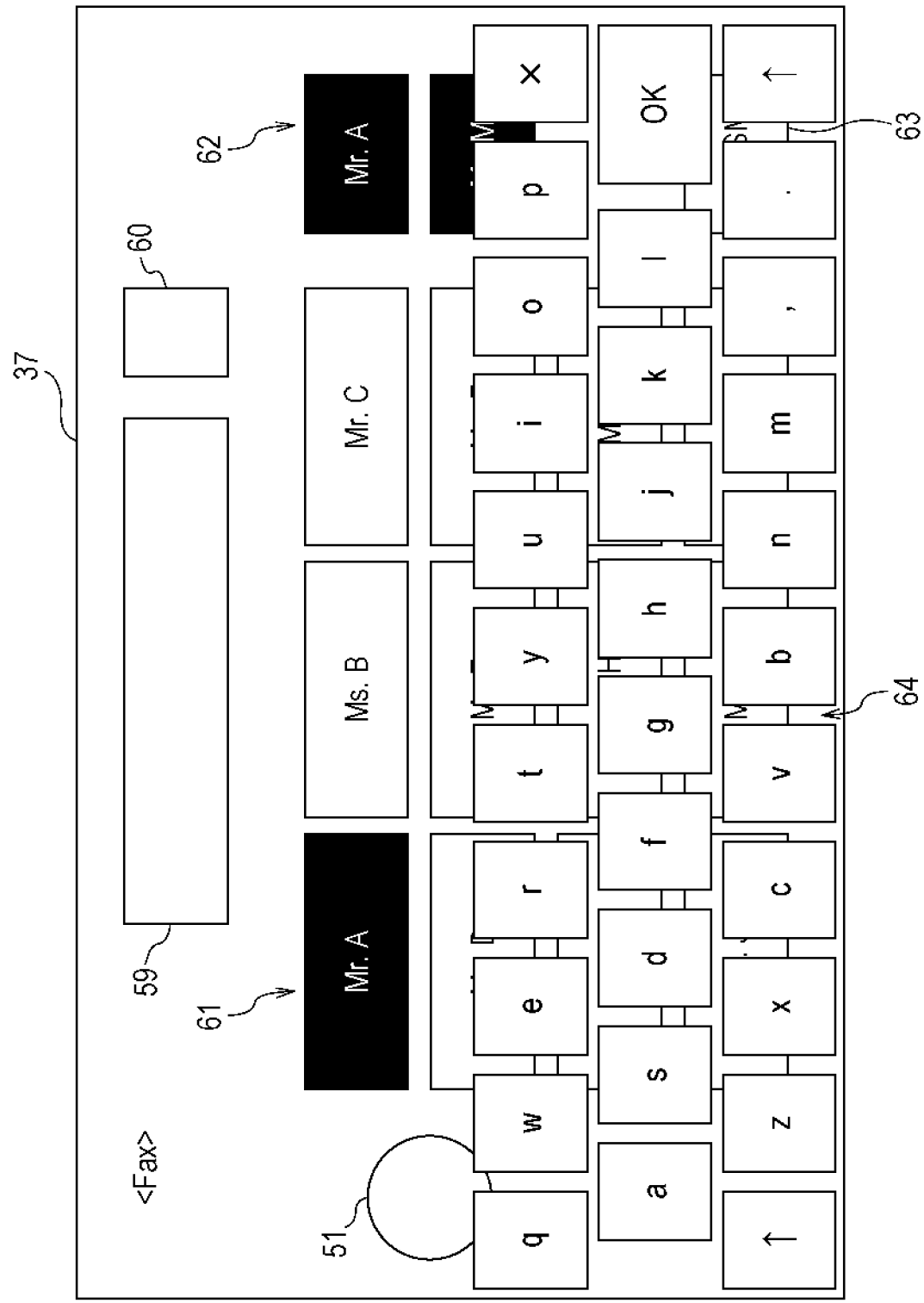
FIG. 11 illustrates a 10th display example of the display of the image forming apparatus.

FIG. 11 illustrates a 10th display example of the display 37 of the image forming apparatus 20. FIG. 11 illustrates a state after the input field 59 is operated on the execution screen illustrated in FIG. 10.

As illustrated in FIG. 11, on the execution screen after the input field 59 is operated, the keyboard 64 that receives the input of one or more characters for designating a destination for the transmission function is displayed.

Figure 12:
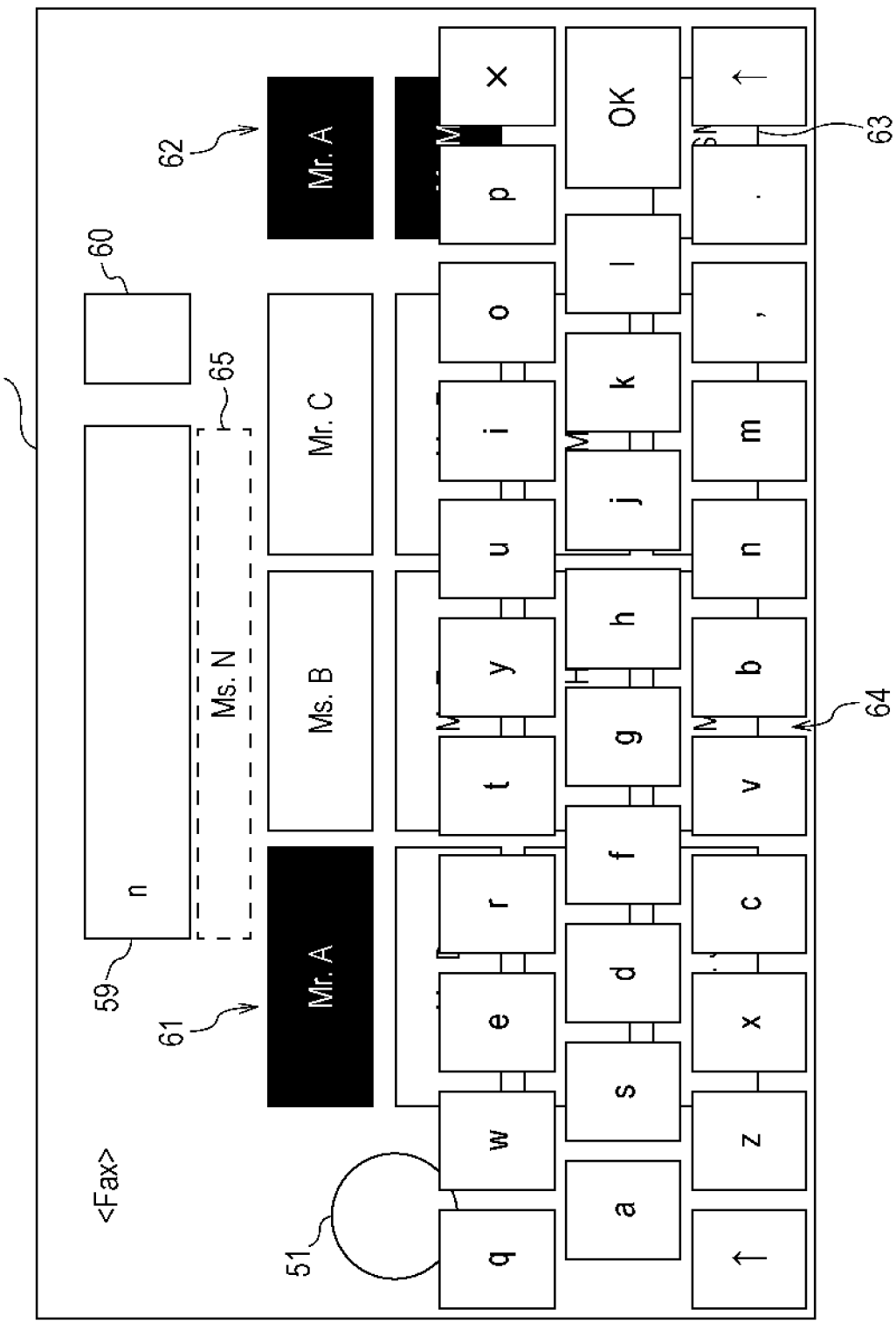
FIG. 12 illustrates an 11th display example of the display of the image forming apparatus.

FIG. 12 illustrates an 11th display example of the display 37 of the image forming apparatus 20. FIG. 12 illustrates a state after the keyboard 64 is operated on the execution screen illustrated in FIG. 11. Specifically, FIG. 12 illustrates a state after the key "n" of the keyboard 64 is operated.

As illustrated in FIG. 12, the character "n" input with the keyboard 64 is displayed within the input field 59 on the execution screen after the keyboard 64 is operated. On the execution screen illustrated in FIG. 12, a candidate display 65 is also displayed below the input field 59, the candidate display 65 representing, as one or more candidates for the destination for the transmission function, one or more users starting with the character input with the keyboard 64 and found in the list of the all destinations registered in the image forming apparatus 20. In the candidate display 65 illustrated in FIG. 12, "Ms. N" is displayed as a user starting with the character "n".

Figure 13:
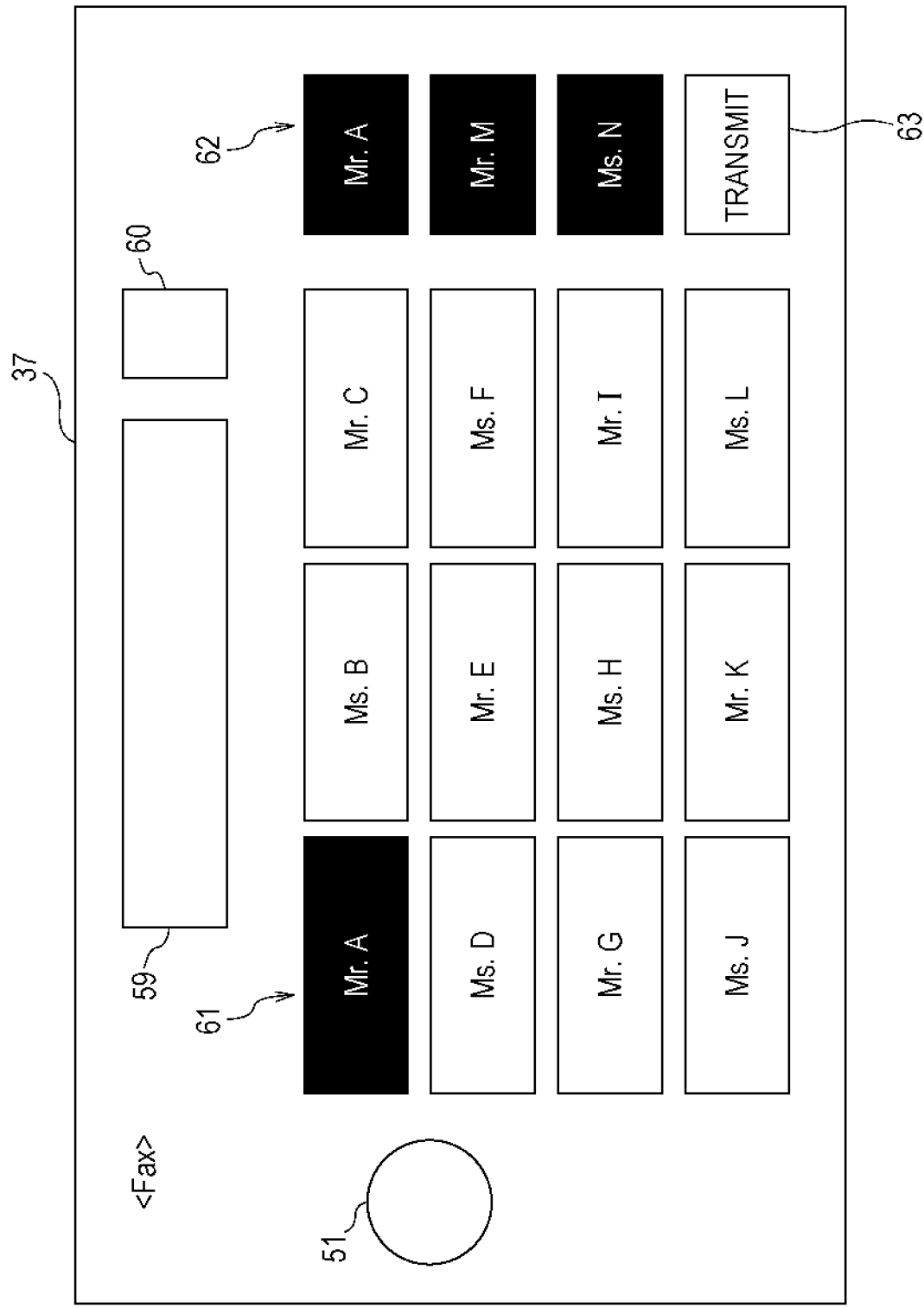
FIG. 13 illustrates a 12th display example of the display of the image forming apparatus.

FIG. 13 illustrates a 12th display example of the display 37 of the image forming apparatus 20. FIG. 13 illustrates a state after the candidate display 65 is operated on the execution screen illustrated in FIG. 12.

On the execution screen illustrated in FIG. 13, "Ms. N" is added as the transmission destination 62 to the execution screen illustrated in FIG. 10. In FIG. 13, in response to the operation of the transmission button 63, faxing is performed to "Mr. A", "Mr. M", and "Ms. N". Note that in FIG. 13, the keyboard 64 and the candidate display 65 have disappeared on the execution screen in response to the operation of the candidate display 65.

As described above, in the first exemplary embodiment, as a designation method for a destination for the transmission function, designation methods using the destination button 61, the destination list 56, and the keyboard 64 are provided. In this case, in the designation method using the destination button 61, a destination for the transmission function may be designated through one operation of the display 37 on the execution screen, and the number of times operations are performed until the destination for the transmission function is designated is lower than that in the designation method using the destination list 56 or the keyboard 64.

The image forming apparatus 20 is also provided with the display setting regarding how the execution screen is displayed. Hereinafter, the display setting will be described.

Figure 14:
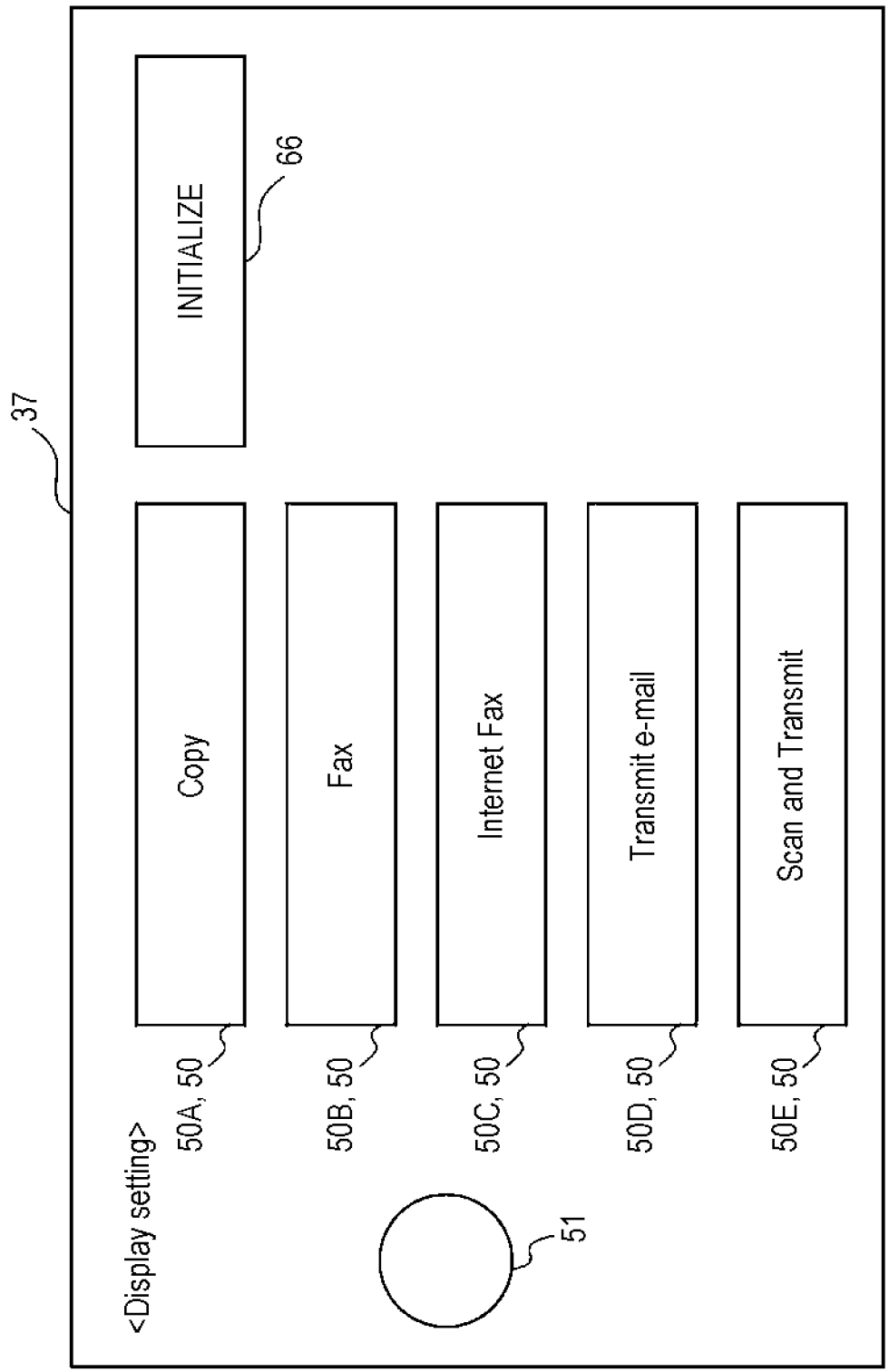
FIG. 14 illustrates a 13th display example of the display of the image forming apparatus.

FIG. 14 illustrates a 13th display example of the display 37 of the image forming apparatus 20. FIG. 14 illustrates a state after the changing button 53 is operated on the setting screen illustrated in FIG. 3.

FIG. 14 depicts the function buttons 50, the setting button 51, and an initialization button 66. If one of the function buttons 50 is operated on the screen illustrated in FIG. 14, the display setting in one of the various functions corresponding to the operated function button 50 is started. In FIG. 14, in response to the operation of the initialization button 66, every display setting is initialized.

Figure 15:
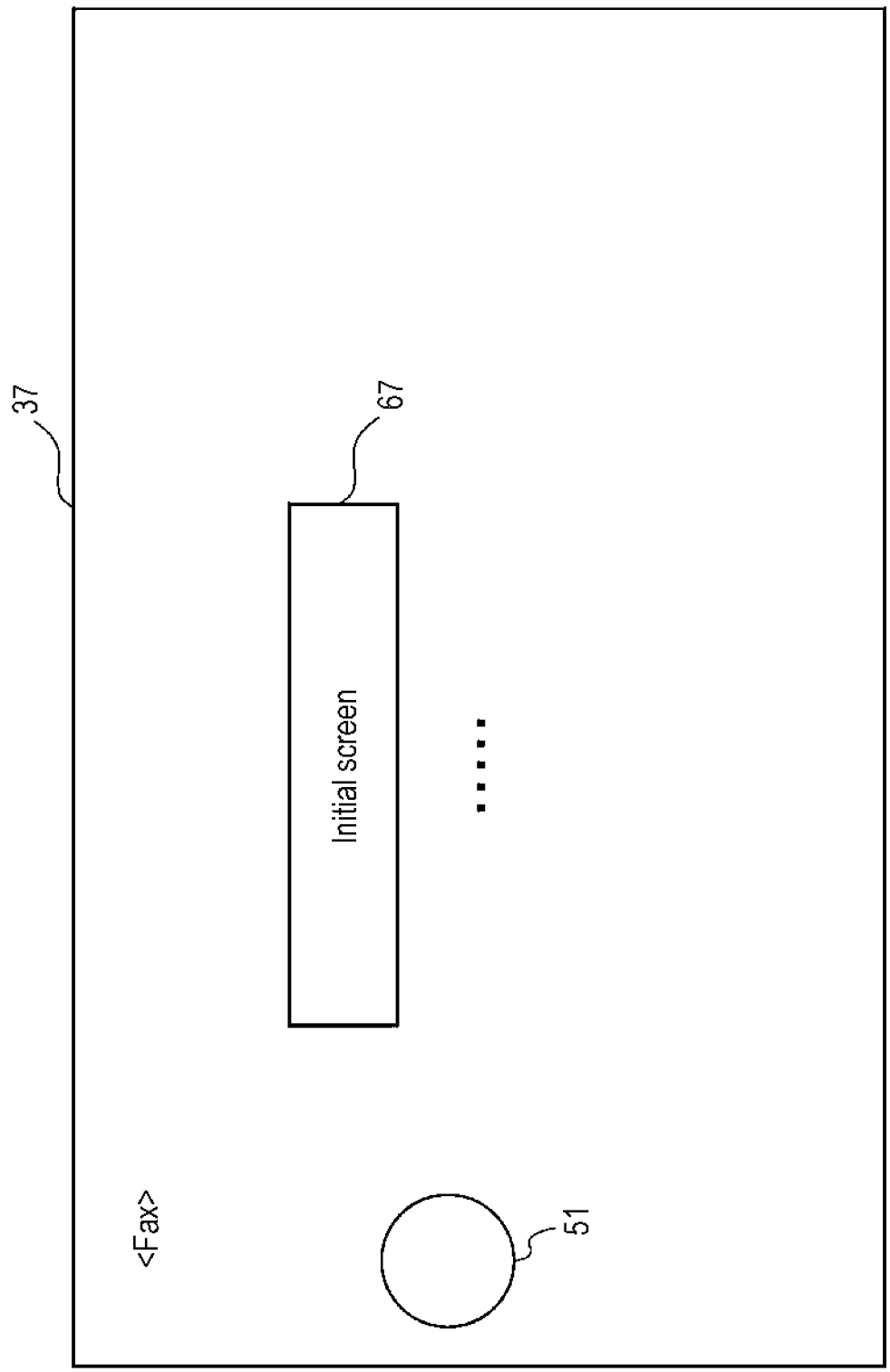
FIG. 15 illustrates a 14th display example of the display of the image forming apparatus.

FIG. 15 illustrates a 14th display example of the display 37 of the image forming apparatus 20. FIG. 15 illustrates a state after the function button 50B is operated on the screen illustrated in FIG. 14.

FIG. 15 depicts the setting button 51 and an item button 67 representing a changeable display setting item. The item button 67 is a button for setting in advance the designation method for a destination for the transmission function on the execution screen. Note that an item different from the item for the designation method for a destination for the transmission function may be provided as the changeable display setting item, and an item button corresponding to the different item may be displayed; however, the illustration is omitted in FIG. 15.

Figure 16:
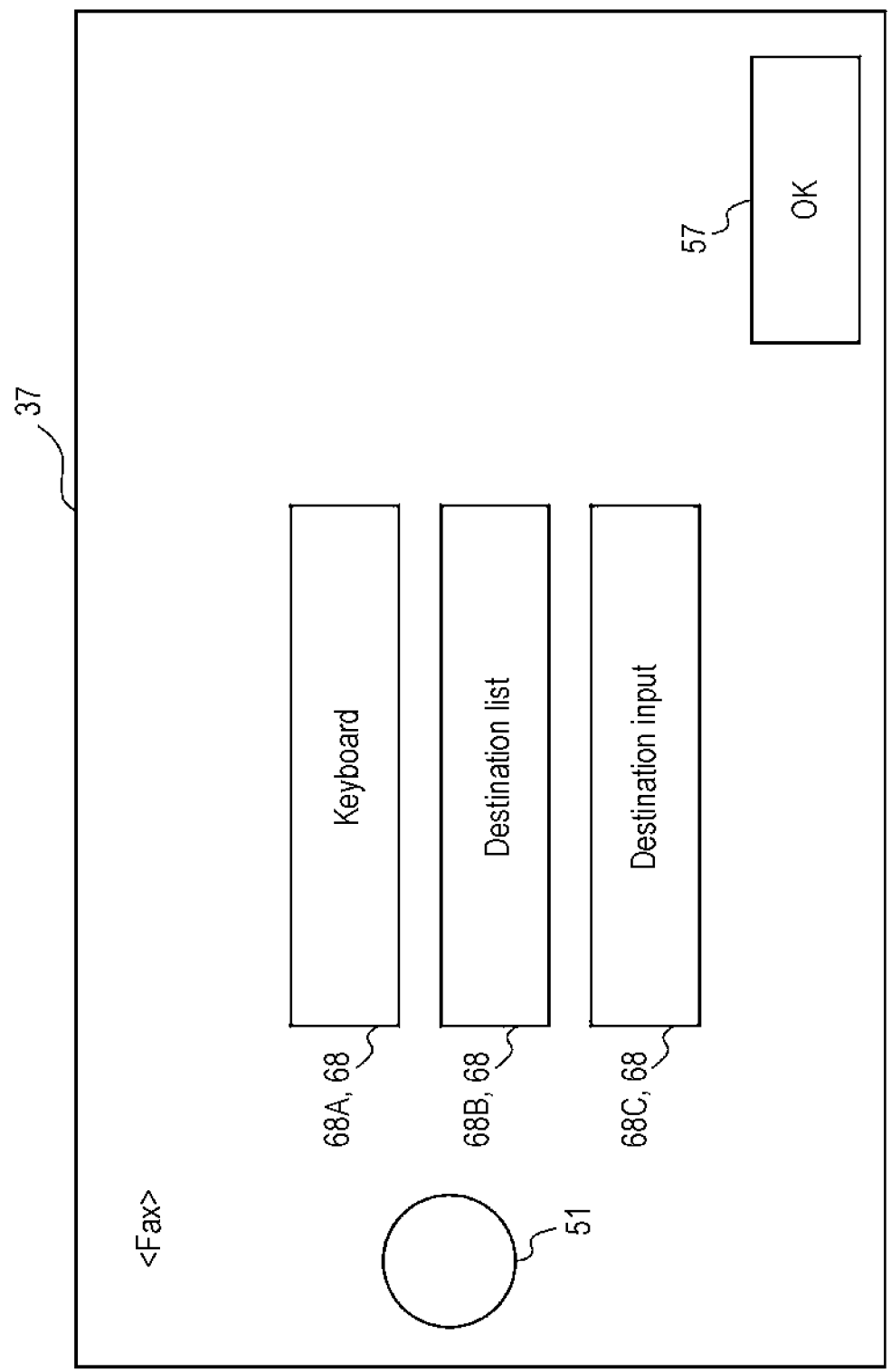
FIG. 16 illustrates a 15th display example of the display of the image forming apparatus.

FIG. 16 illustrates a 15th display example of the display 37 of the image forming apparatus 20. FIG. 16 illustrates a state after the item button 67 is operated on the screen illustrated in FIG. 15.

FIG. 16 depicts the setting button 51, the OK button 57, and selection buttons 68.

The selection buttons 68 are each a button for selecting one of the designation methods for a destination for the transmission function on the execution screen. For example, a selection button 68A for selecting the keyboard 64, a selection button 68B for selecting the destination list 56, and a selection button 68C for selecting the destination input are provided as the selection buttons 68. In FIG. 16, in response to the operation of the OK button 57 in a state where one of the selection buttons 68 is operated, a designation method for a destination for the transmission function corresponding to the selected selection button 68 is registered as the display setting.

Figure 17:
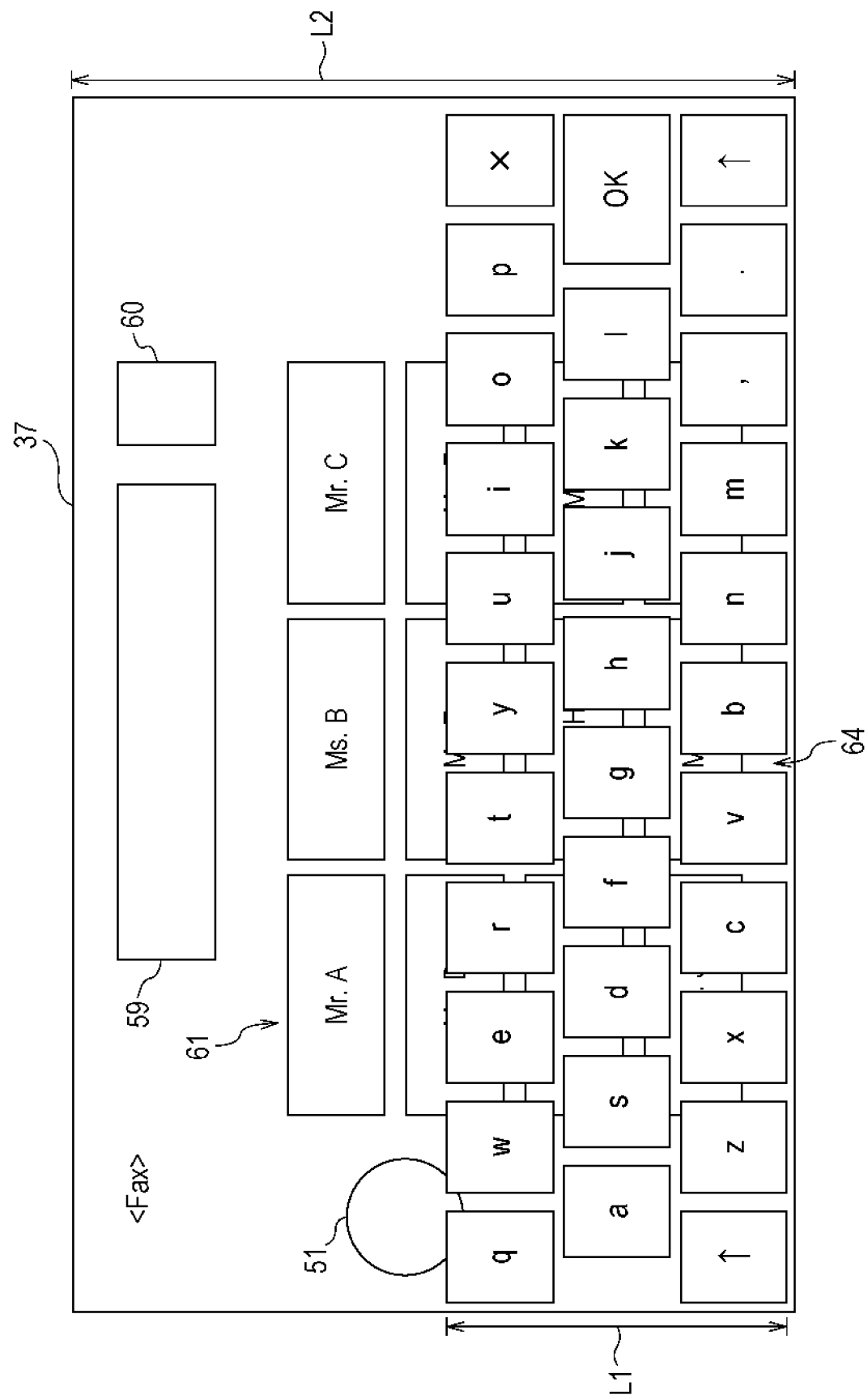
FIG. 17 illustrates a 16th display example of the display of the image forming apparatus.

FIG. 17 illustrates a 16th display example of the display 37 of the image forming apparatus 20. FIG. 17 illustrates the execution screen displayed after the keyboard 64 is selected in the display setting.

As illustrated in FIG. 17, if the keyboard 64 is selected in the display setting, and if the designation function is enabled, the setting button 51, the input field 59, the list button 60, the destination buttons 61, and the keyboard 64 are displayed on the execution screen. At this time, the keyboard 64 hides at least part of the destination buttons 61 displayed on the execution screen. Specifically, the keyboard 64 hides the destination buttons 61 in lower three rows.

The keyboard 64 occupies at least a one-third area extending from the lower part of the display 37 toward the upper part thereof. Specifically, a length L1 of the keyboard 64 is longer than or equal to one third of a length L2 of the display 37. In the first exemplary embodiment, the length L1 is about one half of the length L2. Note that the width of the keyboard 64 is approximately the same as the width of the display 37.

Note that the execution screen displayed after the destination list 56 is selected in the display setting has the content of the display example illustrated in FIG. 8. The execution screen in this case thus has the same content as that of the list screen.

If the designation function is enabled, the execution screen displayed after the selection of the destination input in the display setting has the content without the keyboard 64, like the display example illustrated in FIG. 6. In this case, the execution screen enables the user to select any designation method without a specific designation method for a destination for the transmission function being displayed preferentially.

In the first exemplary embodiment, if the display setting has not been performed once in the image forming apparatus 20, or if the display setting is initialized after the setting of the display setting, the display setting is in an unset state where selection by the user has not been performed explicitly. If the display setting is unset, the default setting is applied. For example, in the default setting in the display setting, the keyboard 64 is set as the designation method for a destination for the transmission function.

Figure 18:
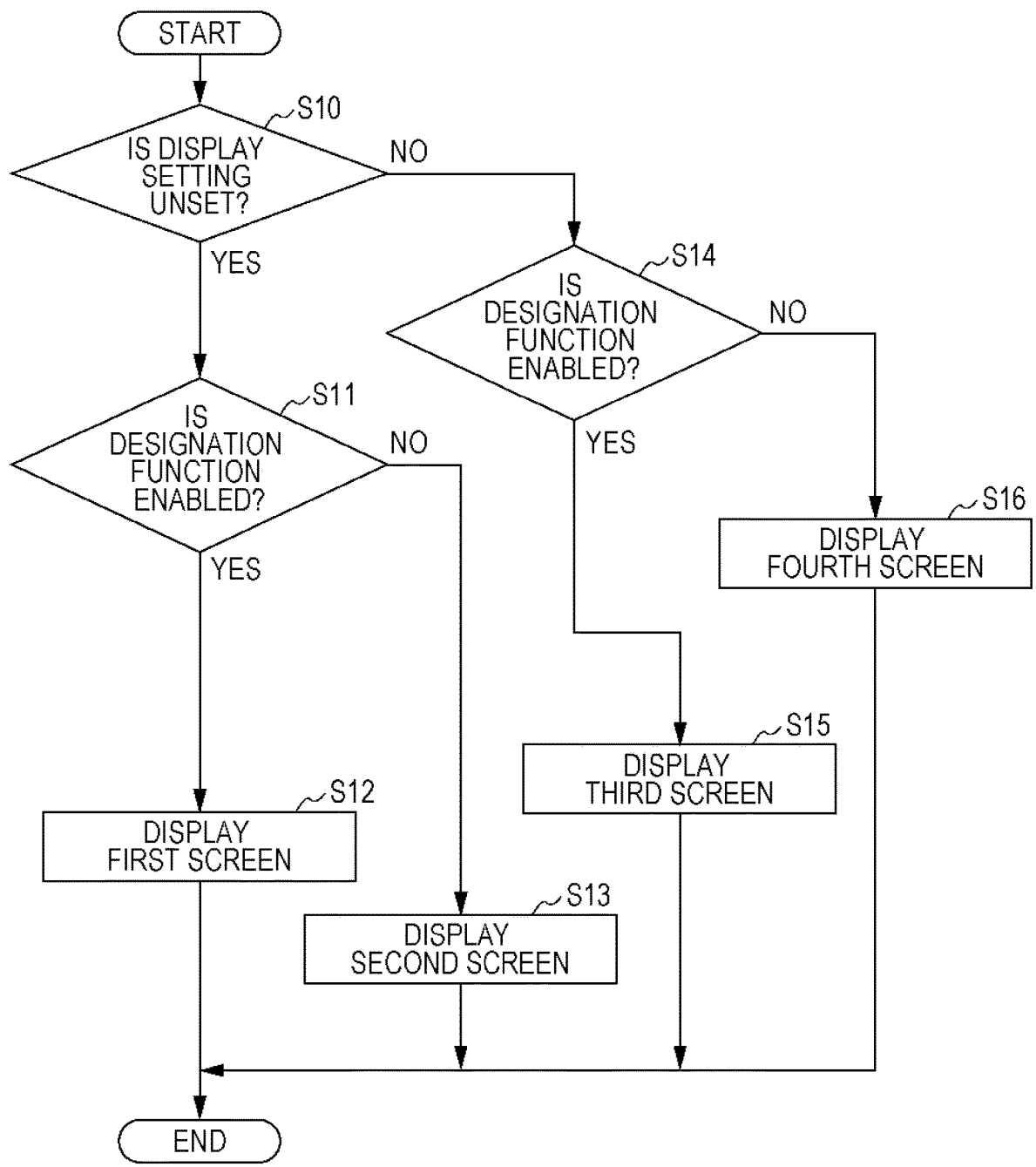
FIG. 18 is a first flowchart illustrating a decision process performed by the image forming apparatus.

FIG. 18 is a first flowchart illustrating the decision process performed by the image forming apparatus 20 in which the content to be displayed on the execution screen is decided. The decision process is executed in such a manner that the CPU 31 reads out the information processing program from the memory 36, loads the program into the RAM 33, and then runs the program. For example, if one of the function buttons 50B, 50C, 50D, and 50E serving as the function buttons 50 for executing the transmission function is operated on the Home screen illustrated in FIG. 2, the CPU 31 starts the decision process.

In step S10 illustrated in FIG. 18, the CPU 31 determines whether the display setting is unset. If the CPU 31 determines that the display setting is unset (step S10: YES), the processing proceeds to step S11. In contrast, if the CPU 31 determines that the display setting is not unset (step S10: NO), the processing proceeds to step S14.

In step S11, the CPU 31 determines whether the designation function is enabled. If the CPU 31 determines that the designation function is enabled (step S11: YES), the processing proceeds to step S12. In contrast, if the CPU 31 determines that the designation function is not enabled (step S11: NO), the processing proceeds to step S13.

In step S12, the CPU 31 causes a first screen to be displayed as the execution screen. The CPU 31 then terminates the decision process. As the content of the first screen, the destination buttons 61 are displayed on the execution screen without the keyboard 64. For example, FIG. 6 depicts the first screen. In this case, since the display setting is unset, the default setting in the display setting is applied, and the keyboard 64 is normally displayed on the execution screen. However, as an exception, the CPU 31 causes the destination buttons 61 to be displayed on the execution screen without the keyboard 64.

Figure 19:
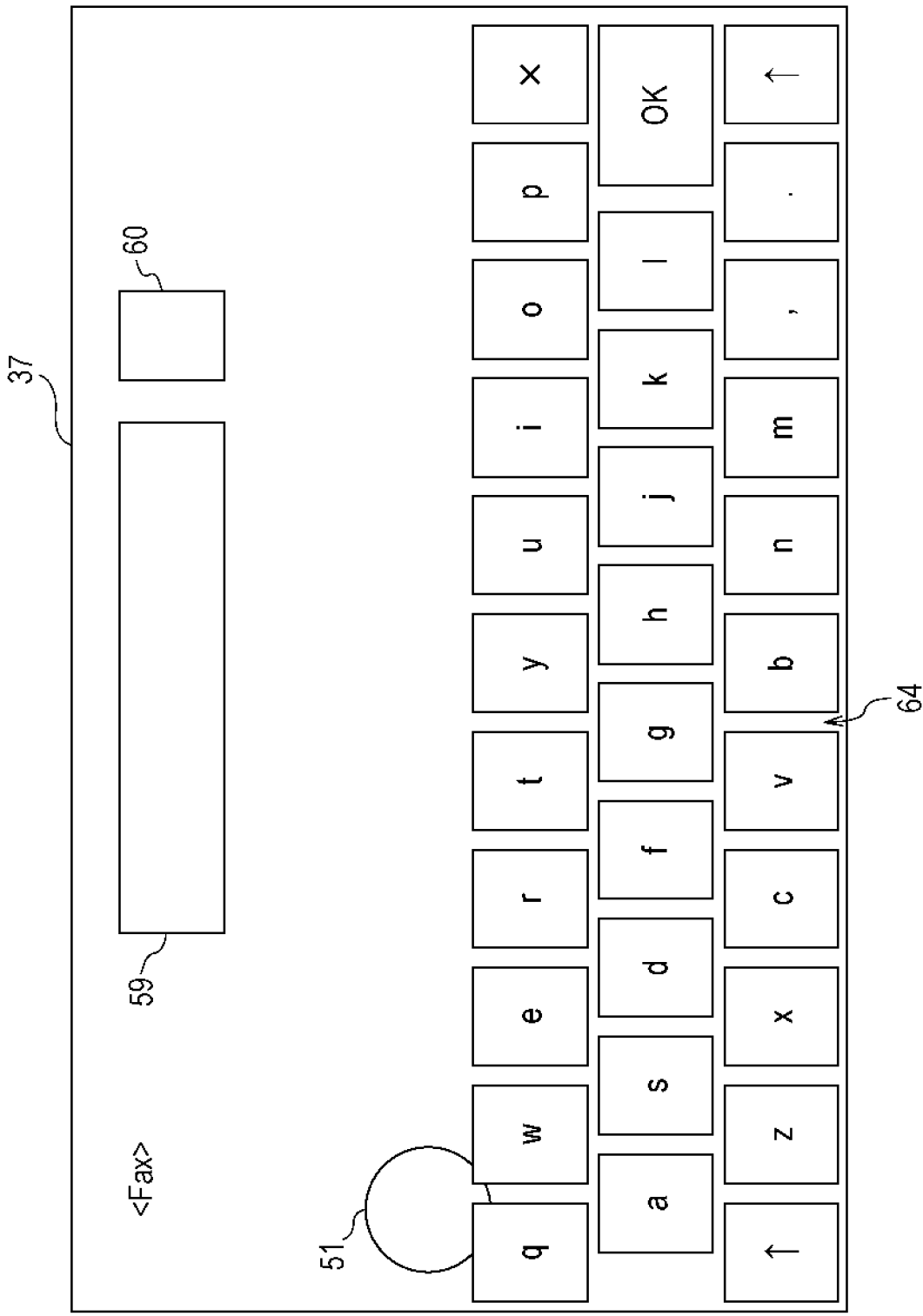
FIG. 19 illustrates a 17th display example of the display of the image forming apparatus.

In step S13, the CPU 31 causes a second screen to be displayed as the execution screen. The CPU 31 then terminates the decision process. As the content of the second screen, the default setting in the display setting is applied to display the keyboard 64 on the execution screen without the destination buttons 61. For example, FIG. 19 illustrating the 17th display example of the display 37 of the image forming apparatus 20 depicts the second screen.

Referring back to FIG. 18, in step S14, the CPU 31 determines whether the designation function is enabled. If the CPU 31 determines that the designation function is enabled (step S14: YES), the processing proceeds to step S15. In contrast, if the CPU 31 determines that the designation function is not enabled (step S14: NO), the processing proceeds to step S16.

In step S15, the CPU 31 causes a third screen to be displayed as the execution screen. The CPU 31 then terminates the decision process. As the content of the third screen, the designation method for a destination for the transmission function for the display setting selected by the user is displayed. For example, FIGS. 6, 8, and 17 depict the third screen. At this time, if the destination list 56 is selected as the designation method for a destination for the transmission function for the display setting, the destination buttons 61 are not displayed on the execution screen as illustrated in FIG. 8. If the destination input or the keyboard 64 is selected, the destination buttons 61 are displayed on the execution screen as illustrated in FIGS. 6 and 17.

Figure 20:
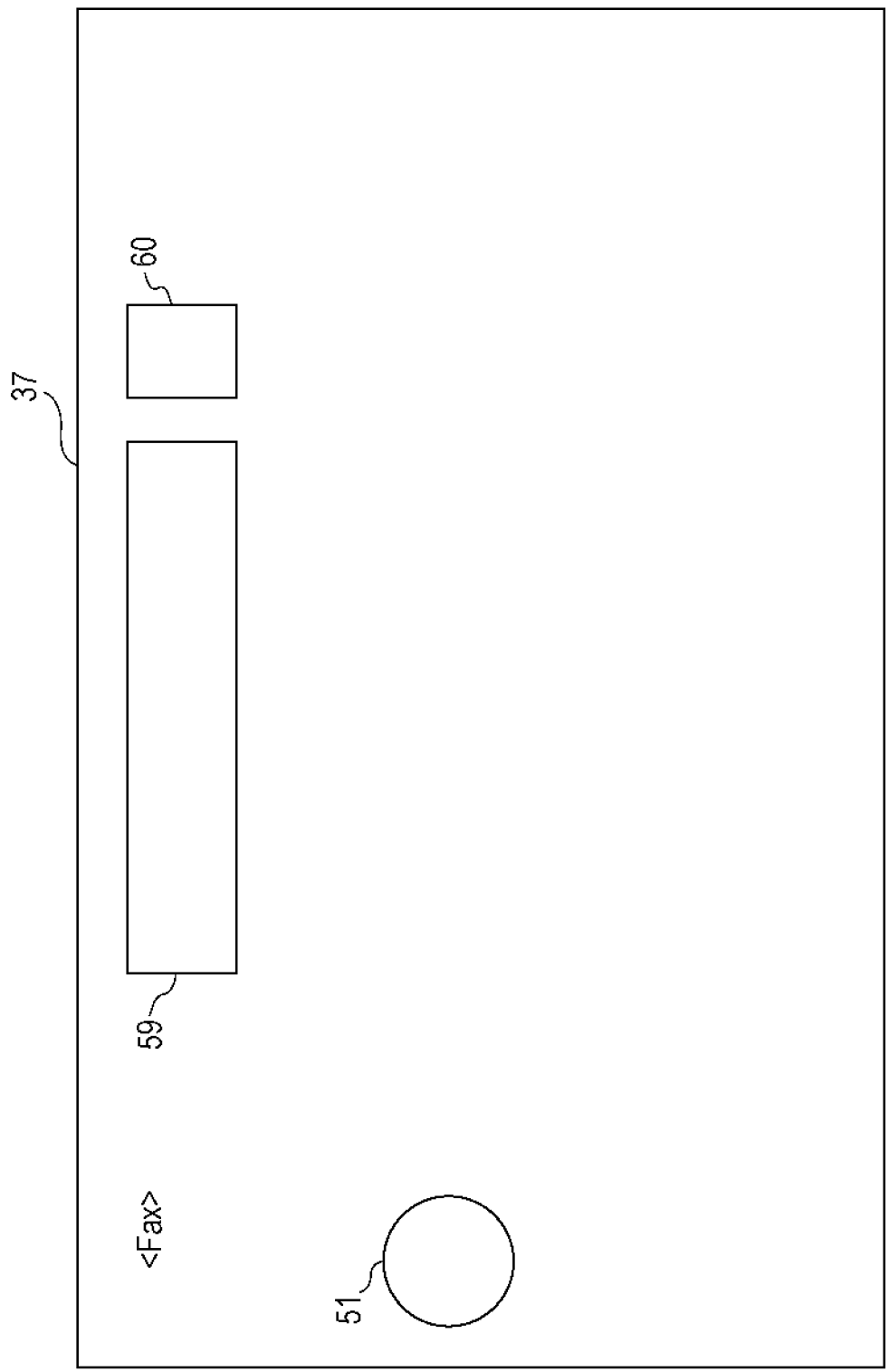
FIG. 20 illustrates an 18th display example of the display of the image forming apparatus.

In step S16, the CPU 31 causes a fourth screen to be displayed as the execution screen. The CPU 31 then terminates the decision process. As the content of the fourth screen, the designation method for a destination for the transmission function for the display setting selected by the user is displayed on the execution screen without the destination buttons 61. For example, FIGS. 8 and 19 and FIG. 20 illustrating an 18th display example of the display 37 of the image forming apparatus 20 depict the fourth screen.

In the first exemplary embodiment, if the keyboard 64 is selected in the display setting, and if the designation function is enabled, the CPU 31 causes the keyboard 64 and the destination buttons 61 to be displayed on the execution screen (see FIG. 17).

In the image forming apparatus in the related art, if the display setting is unset, and if the designation function is enabled, the keyboard and the buttons corresponding to the destination buttons 61 are displayed on the execution screen, like the case where the keyboard 64 is selected and where the designation function is enabled in the display setting in the image forming apparatus 20 of the first exemplary embodiment. If the keyboard and the destination buttons 61 are displayed on the execution screen, the keyboard hides at least part of the buttons, like the display example illustrated in FIG. 17. Accordingly, in the image forming apparatus in the related art, if the display setting is unset, and if the designation function is enabled, it is not possible to designate a destination for the transmission function from all of the buttons displayed on the execution screen unless the keyboard hiding the buttons is made disappear from the display. The image forming apparatus in the related art is thus not convenient. If a user has not performed the display setting because they do not use or not recognize the display setting but intends to designate a destination for the transmission function from among the buttons, the configuration described above causes the user to perform the operation for disappearing the keyboard from the display every time.

In contrast, in the first exemplary embodiment, if the display setting is unset, and if the designation function is enabled, the CPU 31 causes the destination buttons 61 to be displayed on the execution screen without displaying the keyboard 64 (see FIG. 6). According to the first exemplary embodiment, this thereby may provide the user who has not performed the display setting with operability for designating a destination for the transmission function from among all of the destination buttons 61 displayed on the execution screen without causing the user to perform an operation of the display 37. In other words, the phrase "without displaying the keyboard 64" may also be "prohibiting the keyboard 64 from being displayed", "making the keyboard 64 difficult to see by the user", and the like.

In the first exemplary embodiment, the case where the display setting is unset includes a case where the display setting has not been performed once and a case where the display setting is initialized after the display setting is performed. According to the first exemplary embodiment, whether the display setting is unset may thereby be determined on the basis of multiple aspects.

In the first exemplary embodiment, if a predetermined operation by the user is received, the CPU 31 initializes the display setting. For example, if the initialization button 66 illustrated in FIG. 14 is operated as the predetermined operation, the CPU 31 initializes the display setting. According to the first exemplary embodiment, the user may thereby restore the display setting to an unset state at their option.

In the first exemplary embodiment, the CPU 31 receives the display setting at least one of for each of multiple users or for each of multiple transmission functions. For example, the CPU 31 receives the display setting both for each user and for each transmission function. According to the first exemplary embodiment, unique display setting may thereby be selected both for each user and for each transmission function.

In the first exemplary embodiment, the CPU 31 causes the keyboard 64 to be displayed on the execution screen in such a manner that the keyboard 64 occupies at least a one-third area extending from the lower part of the display 37 toward the upper part thereof (see FIG. 17). According to the first exemplary embodiment, input of a character for designating the destination for the transmission function by the user may thereby be received with the keyboard 64 displayed in the lower part of the display 37.

Second Exemplary Embodiment

A second exemplary embodiment will then be described with portions overlapping with the other exemplary embodiments being omitted or simplified.

Figure 21:
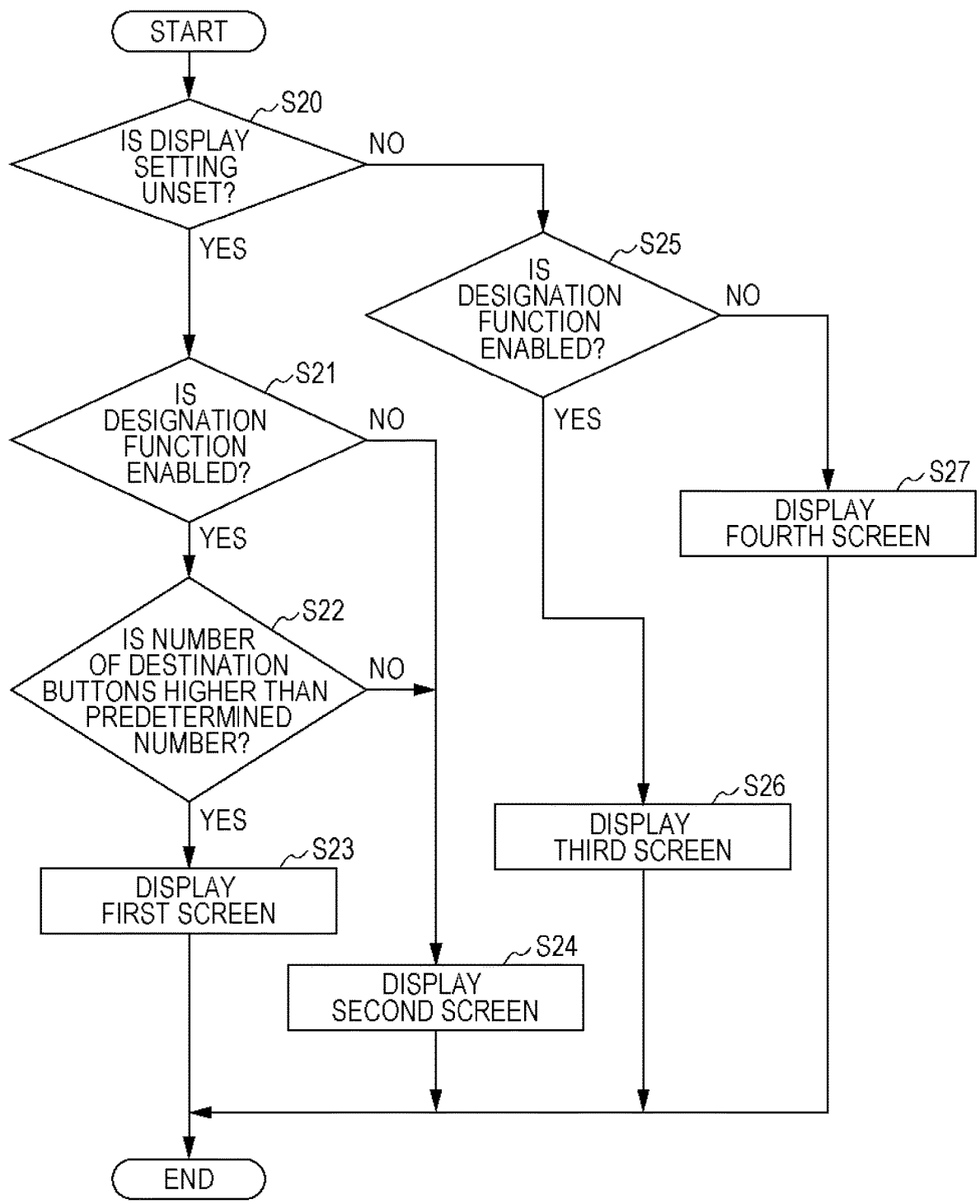
FIG. 21 is a second flowchart illustrating a decision process performed by the image forming apparatus.

FIG. 21 is a second flowchart illustrating a decision process.

In step S20 illustrated in FIG. 21, the CPU 31 determines whether the display setting is unset. If the CPU 31 determines that the display setting is unset (step S20: YES), the processing proceeds to step S21. In contrast, if the CPU 31 determines that the display setting is not unset (step S20: NO), the processing proceeds to step S25.

In step S21, the CPU 31 determines whether the designation function is enabled. If the CPU 31 determines that the designation function is enabled (step S21: YES), the processing proceeds to step S22. In contrast, if the CPU 31 determines that the designation function is not enabled (step S21: NO), the processing proceeds to step S24.

In step S22, the CPU 31 determines whether the number of destination buttons 61 displayed on the execution screen is higher than a predetermined number. If the CPU 31 determines that the number of destination buttons 61 is higher than a predetermined number (step S22: YES), the processing proceeds to step S23. In contrast, if the CPU 31 determines that the number of destination buttons 61 is not higher than a predetermined number (step S22: NO), the processing proceeds to step S24. The details of the predetermined number described above will be described later.

In step S23, the CPU 31 causes the first screen to be displayed as the execution screen. The CPU 31 then terminates the decision process.

Figure 22:
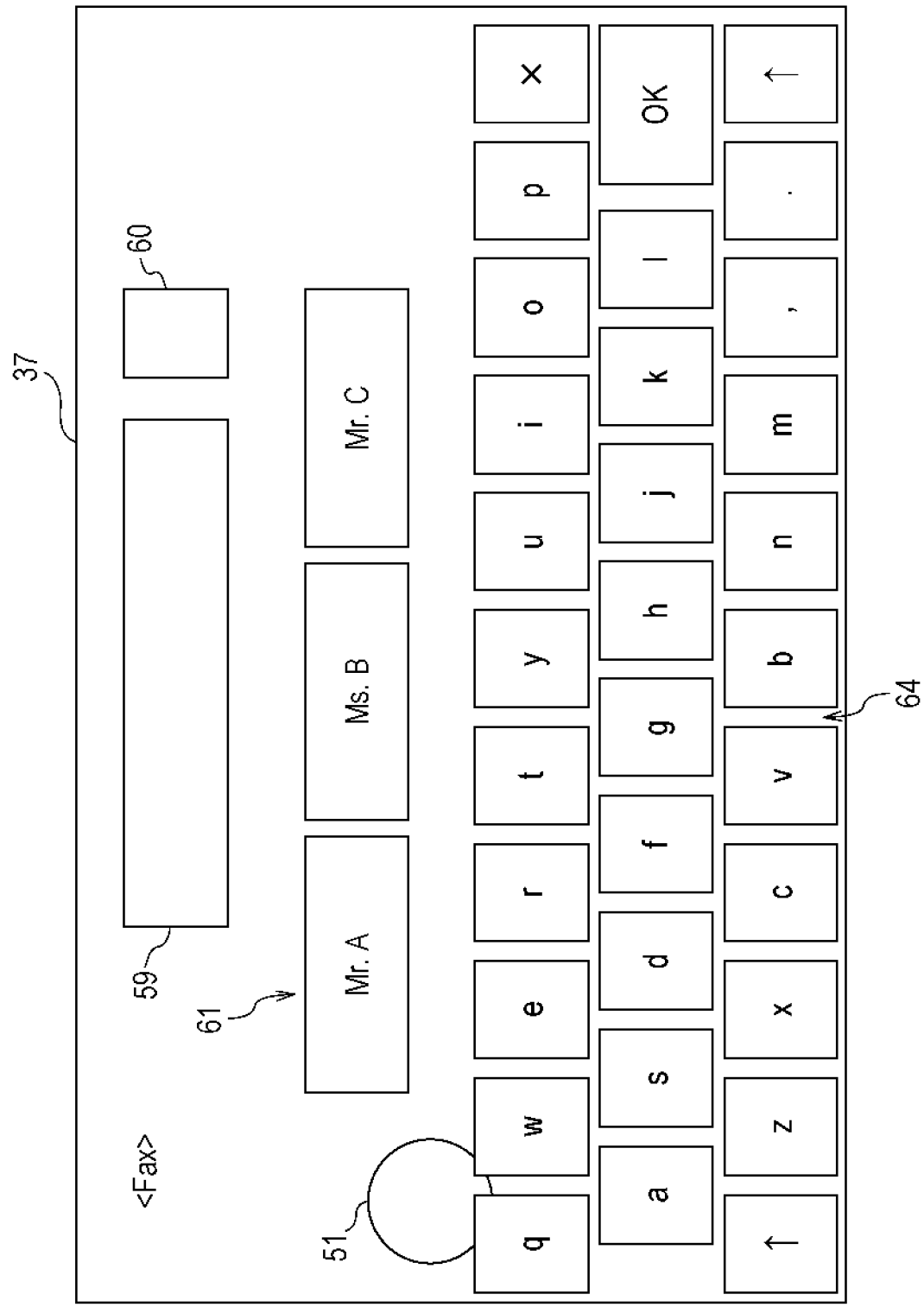
FIG. 22 illustrates a 19th display example of the display of the image forming apparatus.

In step S24, the CPU 31 causes a second screen to be displayed as the execution screen. The CPU 31 then terminates the decision process. The content of the second screen in the second exemplary embodiment includes the following content: the destination buttons 61 are not displayed on the execution screen, but the keyboard 64 is displayed because the default setting in the display setting is applied; and the destination buttons 61 are displayed on the execution screen, and the keyboard 64 is also displayed because the default setting in the display setting is applied. For example, FIG. 19 and FIG. 22 illustrating the 19th display example of the display 37 of the image forming apparatus 20 depict the second screen. For example, if the processing proceeds to No in step S21 to reach step S24, the CPU 31 causes the content illustrated in FIG. 19 to be displayed as the second screen. If the processing proceeds to No in step S22 to reach step S24, the CPU 31 causes the content illustrated in FIG. 22 as the second screen.

Referring back to FIG. 21, in step S25, the CPU 31 determines whether the designation function is enabled. If the CPU 31 determines that the designation function is enabled (step S25: YES), the processing proceeds to step S26. In contrast, if the CPU 31 determines that the designation function is not enabled (step S25: NO), the processing proceeds to step S27.

In step S26, the CPU 31 causes the third screen to be displayed as the execution screen. The CPU 31 then terminates the decision process.

In step S27, the CPU 31 causes the fourth screen to be displayed as the execution screen. The CPU 31 then terminates the decision process.

As described above, in the second exemplary embodiment, if the display setting is unset, if the designation function is enabled, and further if the number of destination buttons 61 displayed on the execution screen is higher than the predetermined number, the CPU 31 causes the destination buttons 61 to be displayed on the execution screen without the keyboard 64 (step S22: YES to step S23). According to the second exemplary embodiment, whether to display the destination buttons 61 on the execution screen without the keyboard 64 is thereby decided on the basis of the number of destination buttons 61 displayed on the execution screen.

In the second exemplary embodiment, if the display setting is unset, if the designation function is enabled, and if the number of destination buttons 61 displayed on the execution screen is lower than or equal to the predetermined number, the CPU 31 causes the keyboard 64 and the destination buttons 61 to be displayed on the execution screen (step S22: NO to step S24). According to the second exemplary embodiment, whether to display the keyboard 64 and the destination buttons 61 on the execution screen is thereby decided on the basis of the number of destination buttons 61 displayed on the execution screen.

The CPU 31 decides the predetermined number described above on the basis of the number of destination buttons 61 arranged in at least one of the longitudinal direction or the lateral direction of the display 37. The CPU 31 thus decides a threshold for whether to display the keyboard 64 on the execution screen on the basis of the number of destination buttons 61 arranged in at least one of the longitudinal direction or the lateral direction of the display 37. In the second exemplary embodiment, for example, the CPU 31 decides the predetermined number on the basis of the number of destination buttons 61 arranged in the lateral direction of the display 37. According to the second exemplary embodiment, the threshold related to the number of destination buttons 61 arranged in the lateral direction of the display 37 may thereby be decided.

In the second exemplary embodiment, the predetermined number described above is the number of destination buttons 61 not hidden by the keyboard 64 on the execution screen. According to the second exemplary embodiment, the number of destination buttons 61 not hidden by the keyboard 64 may thereby be used as the threshold described above.

With reference to FIG. 17, if the keyboard 64 and the destination buttons 61 are displayed on the execution screen, the three destination buttons 61 arranged in the top row in the lateral direction of the display 37 are not hidden by the keyboard 64. Accordingly, in the second exemplary embodiment, the CPU 31 decides 3 as the predetermined number described above, 3 being the number of destination buttons 61 not hidden by the keyboard 64 and arranged on the execution screen in the lateral direction of the display 37.

As described above, in the second exemplary embodiment, if the display setting is unset, if the designation function is enabled, and if the number of destination buttons 61 displayed on the execution screen is higher than 3 that is the number of destination buttons 61 not hidden by the keyboard 64, the CPU 31 causes the destination buttons 61 to be displayed on the execution screen without the keyboard 64, to prevent the at least part of the destination buttons 61 from being hidden by the keyboard 64 (see FIG. 6).

In contrast, in the second exemplary embodiment, if the display setting is unset, if the designation function is enabled, and if the number of destination buttons 61 displayed on the execution screen is lower than or equal to 3 that is the number of destination buttons 61 not hidden by the keyboard 64, the CPU 31 causes the keyboard 64 and the destination buttons 61 to be displayed on the execution screen because displaying the keyboard 64 does not cause the destination buttons 61 to be hidden by the keyboard 64 (see FIG. 22).

In the second exemplary embodiment, the destination buttons 61 not hidden by the keyboard 64 are arranged on the execution screen in at least one of the longitudinal direction or the lateral direction of the display 37. In the second exemplary embodiment, for example, the three destination buttons 61 not hidden by the keyboard 64 are displayed in such a manner as to be arranged on the execution screen in the lateral direction of the display 37. According to the second exemplary embodiment, the user may thereby recognize the destination buttons 61 arranged in the lateral direction of the display 37.

Others

In the exemplary embodiments above, the following screen serves as the execution screen: the screen first displayed on the display 37 after any one of the function buttons 50B to 50E serving as the function buttons 50 for executing the transmission function is operated on the Home screen, that is, the initial screen after the operation of one of the function buttons 50B to 50E. However, the execution screen is not limited to the initial screen after the operation of one of the function buttons 50B to 50E and may be a different screen transitioned from the initial screen after the operation of one of the function buttons 50B to 50E.

Figure 23:
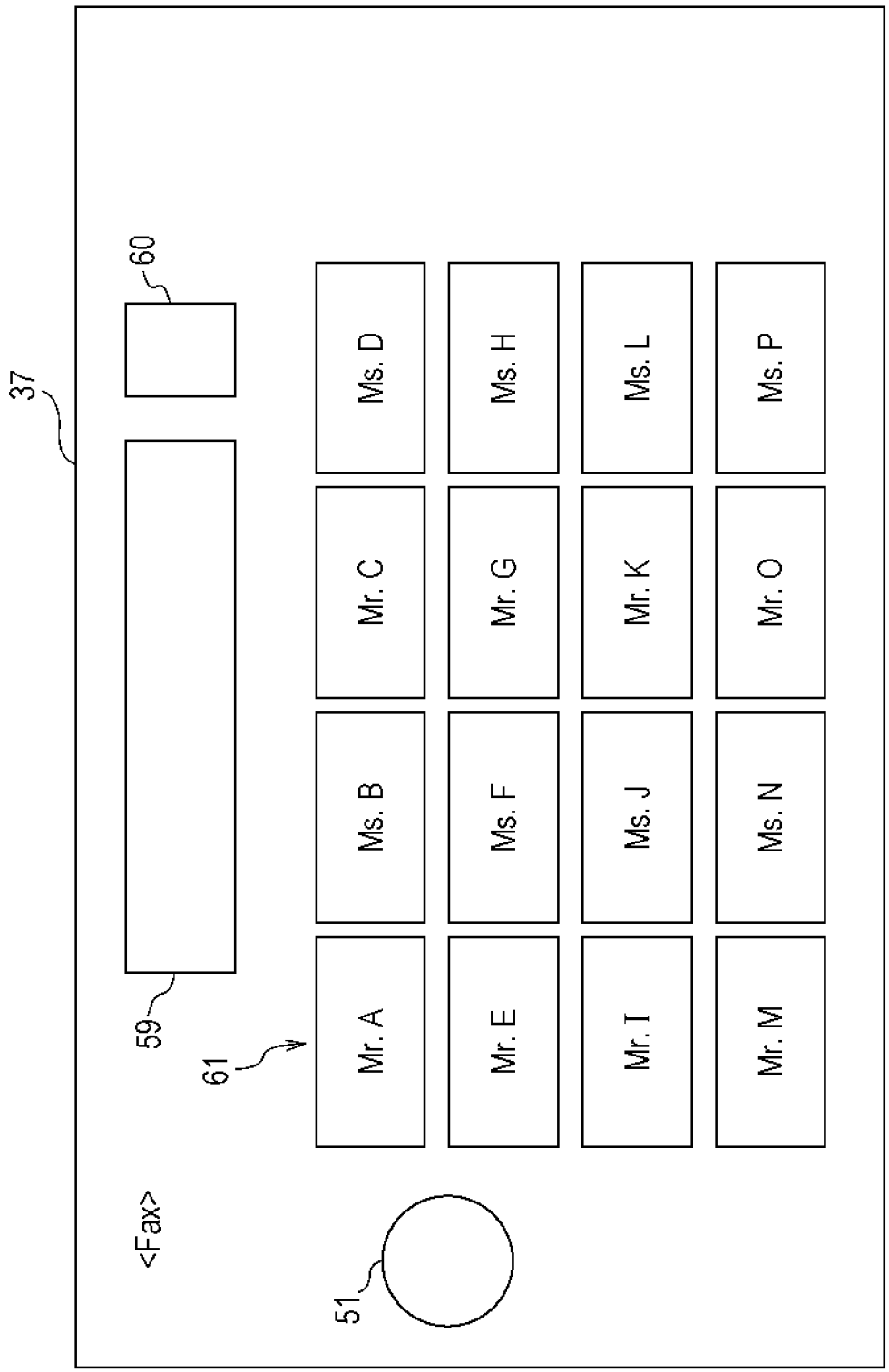
FIG. 23 illustrates a 20th display example of the display of the image forming apparatus.
Figure 24:
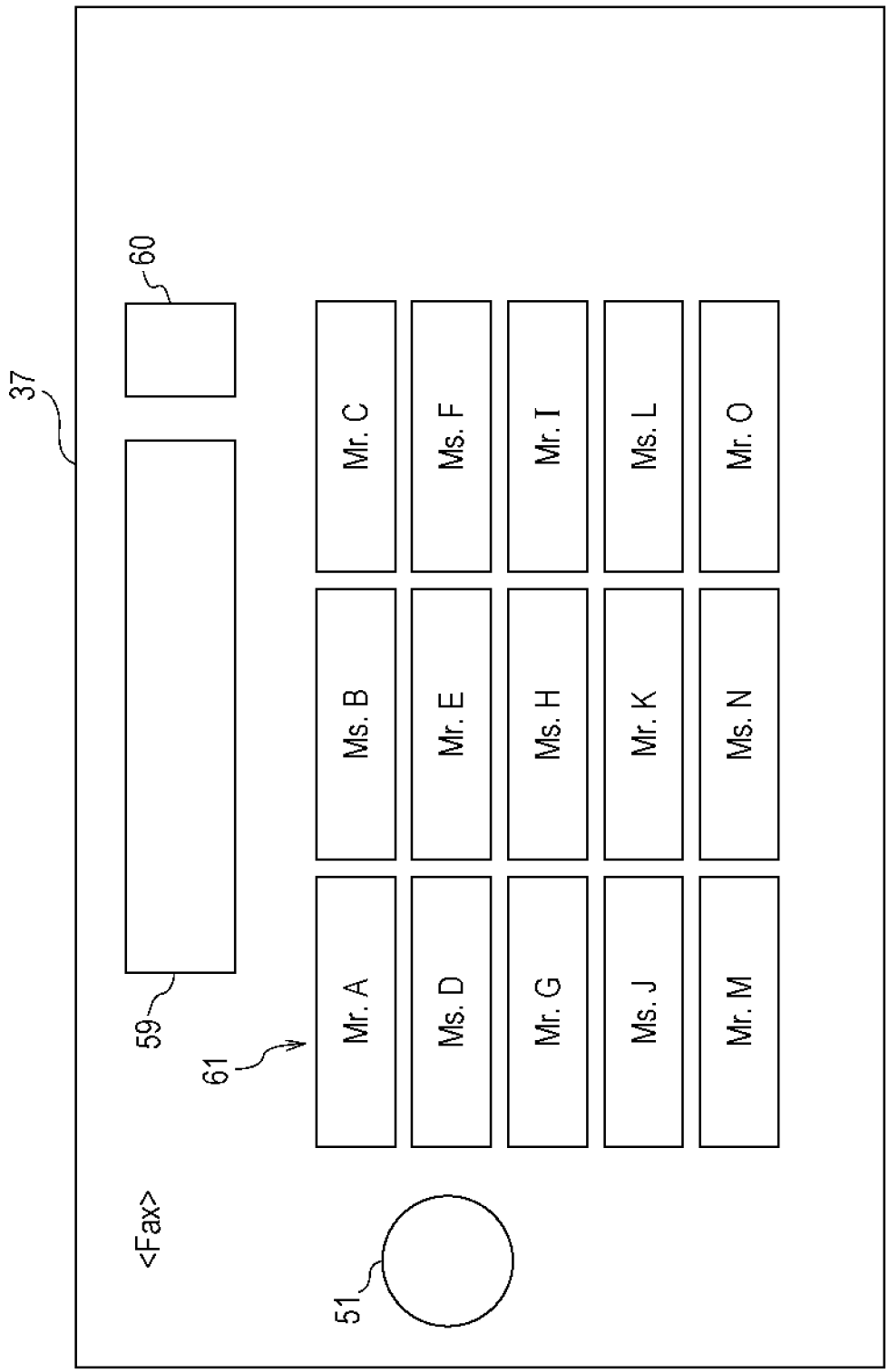
FIG. 24 illustrates a 21st display example of the display of the image forming apparatus.

In the exemplary embodiments above, the four destination buttons 61 are arranged in the longitudinal direction of the display 37, and the three destination buttons 61 are arranged in the lateral direction. Up to 12 destination buttons 61 are displayable on one screen (see FIG. 6). However, the maximum number of destination buttons 61 displayable on one screen and the maximum number of destination buttons 61 arrangeable in the longitudinal direction or in the lateral direction are not limited. In another example, as illustrated in FIG. 23 illustrating the 20th display example of the display 37 of the image forming apparatus 20, the four destination buttons 61 may be arranged in the longitudinal direction of the display 37, the four destination buttons 61 may be arranged in the lateral direction, and thus up to 16 destination buttons 61 may be displayed on one screen. As illustrated in FIG. 24 as the 21st display example of the display 37 of the image forming apparatus 20, the five destination buttons 61 may be arranged in the longitudinal direction of the display 37, the three destination buttons 61 may be arranged in the lateral direction, and thus up to 15 destination buttons 61 may be displayed on one screen.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
in a case where a receiving unit is selected and a designation function is enabled, cause the receiving unit and an operator having received an operation by a user to be displayed on an execution screen displayed on a display in executing a transmission function for transmitting information, the receiving unit receiving input of a character for designating a destination for the transmission function in display setting regarding how the execution screen is displayed, the designation function designating, as the destination for the transmission function, a destination corresponding to the operator; and
in a case where the display setting has not been performed and the designation function is enabled, and if the number of operators displayed on the execution screen is lower than or equal to the number of operators not hidden by the receiving unit, cause the receiving unit to be displayed on the execution screen in such a manner as to occupy at least a one-third area extending from a lower part of the display toward an upper part of the display, and cause a plurality of the operators to be displayed in a lateral direction of the display.

2. The information processing apparatus according to claim 1,
wherein the processor is configured to:
in a case where the display setting has not been performed, the designation function is enabled, and further a count of the operator displayed on the execution screen is higher than a predetermined count, cause the operator to be displayed on the execution screen without the receiving unit being displayed.

3. The information processing apparatus according to claim 2,
wherein the processor is configured to:
decide the predetermined count on a basis of the count of the operator disposed in at least one of a longitudinal direction or a lateral direction of the display.

4. The information processing apparatus according to claim 3,
wherein the predetermined count is a count of the operator not hidden by the receiving unit on the execution screen.

5. The information processing apparatus according to claim 4,
wherein a plurality of the operators not hidden by the receiving unit are displayed in-line on the execution screen in at least one of the longitudinal direction or the lateral direction of the display.

6. The information processing apparatus according to claim 1,
wherein the case where the display setting has not been performed includes a case where the display setting has not been performed once and a case where the display setting is initialized after the display setting is performed.

7. The information processing apparatus according to claim 2,
wherein the case where the display setting has not been performed includes a case where the display setting has not been performed once and a case where the display setting is initialized after the display setting is performed.

8. The information processing apparatus according to claim 6,
wherein the processor is configured to:
in a case where a predetermined operation by the user is received, initialize the display setting.

9. The information processing apparatus according to claim 1,
wherein the processor is configured to:
receive the display setting for at least one of each of a plurality of users or each of a plurality of the transmission functions.

10. A non-transitory computer readable medium storing a program causing a computer to execute a process for information processing, the process comprising:
in a case where a receiving unit is selected and a designation function is enabled, causing the receiving unit and an operator having received an operation by a user to be displayed on an execution screen displayed on a display in executing a transmission function for transmitting information, the receiving unit receiving input of a character for designating a destination for the transmission function in display setting regarding how the execution screen is displayed, the designation function designating, as the destination for the transmission function, a destination corresponding to the operator; and
in a case where the display setting has not been performed and the designation function is enabled, and if the number of operators displayed on the execution screen is lower than or equal to the number of operators not hidden by the receiving unit, causing the receiving unit to be displayed on the execution screen in such a manner as to occupy at least a one-third area extending from a lower part of the display toward an upper part of the display, and causing a plurality of the operators to be displayed in a lateral direction of the display.

11. An information processing method comprising:
in a case where a receiving unit is selected and a designation function is enabled, causing the receiving unit and an operator having received an operation by a user to be displayed on an execution screen displayed on a display in executing a transmission function for transmitting information, the receiving unit receiving input of a character for designating a destination for the transmission function in display setting regarding how the execution screen is displayed, the designation function designating, as the destination for the transmission function, a destination corresponding to the operator; and
in a case where the display setting has not been performed and the designation function is enabled, and if the number of operators displayed on the execution screen is lower than or equal to the number of operators not hidden by the receiving unit, causing the receiving unit to be displayed on the execution screen in such a manner as to occupy at least a one-third area extending from a lower part of the display toward an upper part of the display, and causing a plurality of the operators to be displayed in a lateral direction of the display.

\* \* \* \* \*